(12) United States Patent
Riley et al.

(10) Patent No.: US 9,102,545 B2
(45) Date of Patent: *Aug. 11, 2015

(54) SYSTEM FOR DECONTAMINATING WATER AND GENERATING WATER VAPOR

(75) Inventors: John D. Riley, Santa Maria, CA (US); Dana L. Johnson, Ventura, CA (US)

(73) Assignee: VERNO HOLDINGS, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/536,581

(22) Filed: Jun. 28, 2012

(65) Prior Publication Data

US 2012/0267232 A1    Oct. 25, 2012

Related U.S. Application Data

(63) Continuation-in-part of application No. 12/488,750, filed on Jun. 22, 2009, now Pat. No. 8,562,791.

(60) Provisional application No. 61/074,743, filed on Jun. 23, 2008.

(51) Int. Cl.
  *C02F 1/06* (2006.01)
  *B01D 3/30* (2006.01)
  *F22B 3/06* (2006.01)
  (Continued)

(52) U.S. Cl.
  CPC .............. *C02F 1/06* (2013.01); *B01D 1/0082* (2013.01); *B01D 1/225* (2013.01); *C02F 1/048* (2013.01); *C02F 1/08* (2013.01); *F22B 3/06* (2013.01); *C02F 1/18* (2013.01); *C02F 2103/08* (2013.01); *C02F 2209/02* (2013.01); *C02F 2209/42* (2013.01)

(58) Field of Classification Search
  CPC ... C02F 1/04–1/041; C02F 1/048; C02F 1/06; C02F 1/08; C02F 1/18; C02F 2103/08; C02F 2209/02–2209/03; C02F 2209/42; C02F 2303/10; B01D 1/0082; B01D 1/221–1/225; B01D 1/228; B01D 1/24; B01D 1/28; B01D 3/06; B01D 3/30; B01D 3/18–3/22; B01D 3/42; F22B 3/06; F01K 17/00; Y10S 159/901; Y10S 202/00; Y10S 203/08; Y10S 203/17–203/18
  See application file for complete search history.

(56) References Cited

U.S. PATENT DOCUMENTS 3,045,981 A * 7/1962 Hendrickson .................. 165/82
3,213,001 A * 10/1965 Schmidt ...................... 202/173

(Continued)

FOREIGN PATENT DOCUMENTS

DE          41 06 112 A1     9/1992

*Primary Examiner* — Virginia Manoharan
(74) *Attorney, Agent, or Firm* — Kelly & Kelley, LLP

(57) ABSTRACT

A system and method for processing a fluid, including decontaminating water and generating water vapor includes introducing the fluid into a vessel. The fluid is moved through a series of rotating trays alternately separated by stationary baffles so as to swirl and heat the fluid to effect the vaporization thereof to produce a vapor having at least some of the contaminants separated therefrom. The vapor is removed from the vessel for condensing apart from the separated contaminants and the remaining water. The vapor may be passed through a turbine connected to an electric generator. Sensors in a controller may be employed to adjust the speed of rotation of the trays or fluid input into the vessel in response to the sensed conditions. The treated fluid may be recirculated and reprocessed through the vessel to increase the purification thereof.

20 Claims, 15 Drawing Sheets

(51) Int. Cl.
    *B01D 1/00*     (2006.01)
    *B01D 1/22*     (2006.01)
    *C02F 1/04*     (2006.01)
    *C02F 1/08*     (2006.01)
    *C02F 1/18*     (2006.01)
    *C02F 103/08*     (2006.01)

(56) References Cited

U.S. PATENT DOCUMENTS

| | | | |
|---|---|---|---|
| 3,373,089 A * | 3/1968 | Vautrain et al. | 203/40 |
| 3,507,577 A * | 4/1970 | Swearingen | 417/53 |
| 3,613,368 A * | 10/1971 | Doerner | 60/657 |
| 3,717,554 A | 2/1973 | Ruthrof | |
| 3,733,816 A * | 5/1973 | Nash et al. | 60/39.281 |
| 3,781,132 A | 12/1973 | Latinen | |
| 4,287,026 A | 9/1981 | Wallace | |
| 4,313,784 A | 2/1982 | Haley | |
| 4,891,140 A | 1/1990 | Burke, Jr. | |
| 4,959,122 A | 9/1990 | Kurematsu et al. | |
| 5,045,155 A | 9/1991 | Ramsland | |
| 5,102,503 A * | 4/1992 | Silinski et al. | 202/83 |
| 5,118,388 A | 6/1992 | Aboul-Nasr | |
| 5,396,844 A | 3/1995 | Hessey | |
| 5,645,493 A | 7/1997 | Garcia | |
| 5,810,975 A | 9/1998 | Bourdel | |
| 5,888,453 A | 3/1999 | Luker | |
| 5,968,321 A * | 10/1999 | Sears | 202/172 |
| 6,689,251 B2 * | 2/2004 | Zebuhr | 202/172 |
| 7,150,807 B2 * | 12/2006 | Genser | 159/6.1 |
| 7,498,175 B2 * | 3/2009 | Cole | 436/177 |
| 7,540,944 B2 | 6/2009 | Bitterly et al. | |
| 7,749,360 B2 | 7/2010 | Waldron | |
| 2002/0157997 A1 * | 10/2002 | Binsfeld et al. | 210/180 |
| 2005/0016828 A1 * | 1/2005 | Bednarek et al. | 203/1 |
| 2007/0193872 A1 | 8/2007 | Garcia et al. | |
| 2007/0235317 A1 * | 10/2007 | Waldron | 203/3 |
| 2008/0210384 A1 * | 9/2008 | Guthrie | 159/6.1 |
| 2009/0145739 A1 | 6/2009 | Cotten | |
| 2009/0309368 A1 | 12/2009 | Kumano | |
| 2009/0313996 A1 | 12/2009 | Riley et al. | |
| 2010/0116756 A1 | 5/2010 | Fletcher | |
| 2011/0094940 A1 * | 4/2011 | Weisselberg | 208/390 |

* cited by examiner

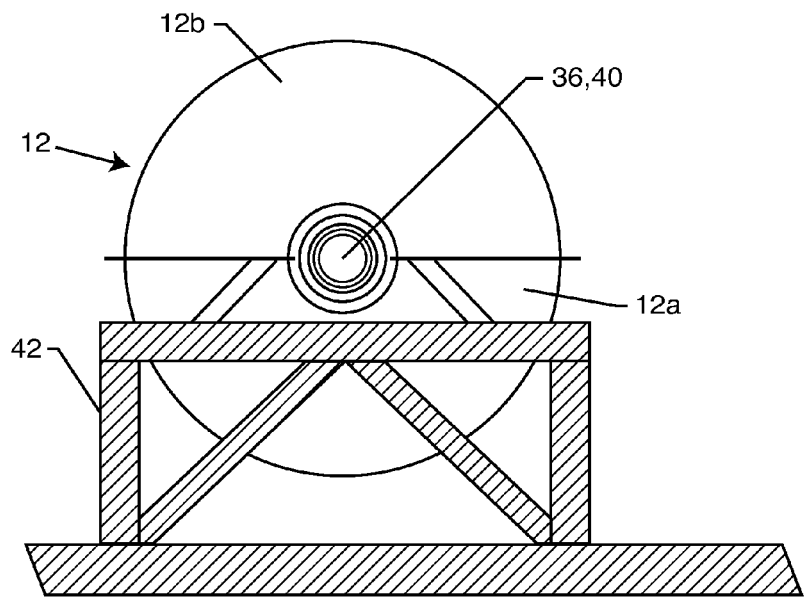
FIG. 4
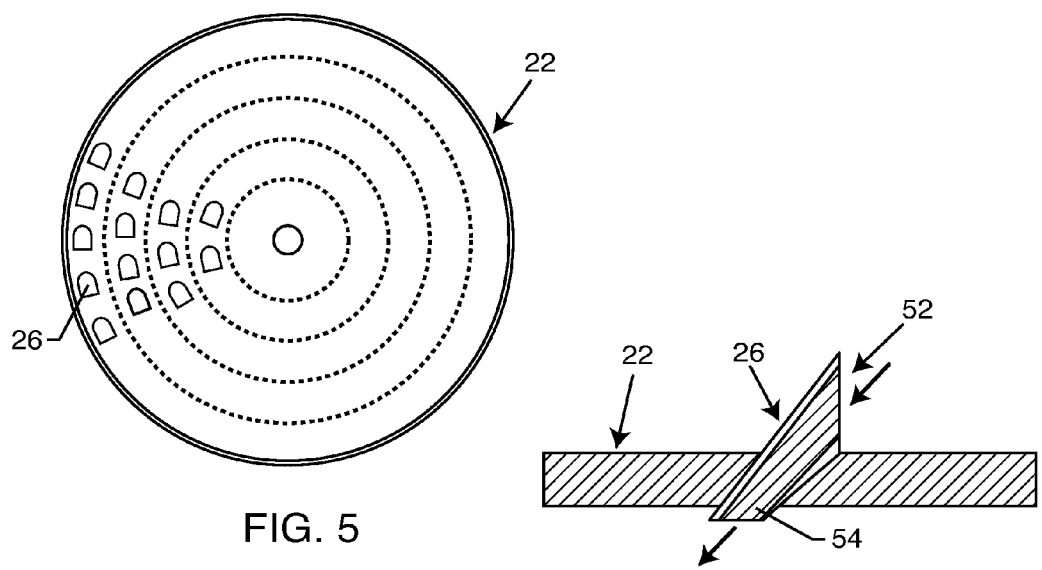
FIG. 5
FIG. 6

SYSTEM FOR DECONTAMINATING WATER AND GENERATING WATER VAPOR

BACKGROUND OF THE INVENTION

The present invention relates to a system for decontaminating water and generating water vapor. More particularly, the present invention relates to an improved method that utilizes a series of sensors and a control system to vaporize water, remove dissolved solids and maximize recovery of potable water from contaminated water via a horizontal water processing vessel.

Desalinization (also desalination or desalinisation) refers to one of many processes for removing excess salt, minerals and other natural or unnatural contaminants from water. Historically, desalinization converted sea water into drinking water onboard ships. Modern desalinization processes are still used on ships and submarines to ensure a constant drinking water supply for the crew. But, desalinization is increasingly being used in arid regions having scarce fresh water resources. In these regions, salt water from the ocean is desalinated to fresh water suitable for consumption (i.e. potable) or for irrigation. The highly concentrated waste product from the desalinization process is commonly referred to as brine, with salt (NaCl) being a typical major by-product. Most modern interest in desalinization focuses on developing cost-effective processes for providing fresh water for use in arid regions where fresh water availability is limited.

Large-scale desalinization is typically costly and generally requires large amounts of energy and an expensive infrastructure. For example, the world's largest desalinization plant primarily uses multi-stage flash distillation and can produce 300 million cubic meters ($m^3$) of water per year. The largest desalinization plant in the United States desalinates 25 million gallons (95,000 $m^3$) of water per day. Worldwide, approximately 13,000 desalinization plants produce more than 12 billion gallons (45 million $m^3$) of water per day. Thus, there is a constant need in the art for improving desalinization methods, namely lowering costs and improving efficiency of the related systems.

Desalinization may be performed by many different processes. For example, several processes use simple evaporation-based desalinization methods such as multiple-effect evaporation (MED or simply ME), vapor-compression evaporation (VC) and evaporation-condensation. In general, evaporation-condensation is a natural desalinization process performed by nature during the hydrologic cycle. In the hydrologic cycle, water evaporates into the atmosphere from sources such as lakes, oceans and streams. Evaporated water then contacts cooler air and forms dew or rain. The resultant water is generally free from impurities. The hydrologic process can be replicated artificially using a series of evaporation-condensation processes. In basic operation, salt water is heated to evaporation. Salt and other impurities dissolve out from the water and are left behind during the evaporation stage. The evaporated water is later condensed, collected and stored as fresh water. Over the years, the evaporation-condensation system has been greatly improved, especially with the advent of more efficient technology facilitating the process. But, these systems still require significant energy input to evaporate the water. An alternative evaporation-based desalinization method includes multi-stage flash distillation, as briefly described above. Multi-stage flash distillation uses vacuum distillation. Vacuum distillation is a process of boiling water at less than atmospheric pressure by creating a vacuum within the evaporation chamber. Hence, vacuum distillation operates at a much lower temperature than MED or VC and therefore requires less energy to evaporate the water to separate the contaminants therefrom. This process is particularly desirable in view of rising energy costs.

Alternative desalinization methods may include membrane-based processes such as reverse osmosis (RO), electrodialisys reversal (EDR), nanofiltration (NF), forward osmosis (FO) and membrane distillation (MD). Of these desalinization processes, reverse osmosis is the most widely used. Reverse osmosis uses semi-permeable membranes and pressure to separate salt and other impurities from water. Reverse osmosis membranes are considered selective. That is, the membrane is highly permeable to water molecules while highly impermeable to salt and other contaminants dissolved therein. The membranes themselves are stored in expensive and highly pressurized containers. The containers arrange the membranes to maximize surface area and salt water flow rate therethrough. Conventional-osmosis desalinization systems typically use one of two techniques for developing high pressure within the system: (1) high-pressure pumps; or (2) centrifuges. A high-pressure pump helps filter salt water through the membrane. The pressure in the system varies according to the pump settings and osmotic pressure of the salt water. Osmotic pressure depends on the temperature of the solution and the concentration of salt dissolved therein. Alternatively, centrifuges are typically more efficient, but are more difficult to implement. The centrifuge spins the solution at high rates to separate materials of varying densities within the solution. In combination with a membrane, suspended salts and other contaminants are subject to constant radial acceleration along the length of the membrane. One common problem with reverse osmosis in general is the removal of suspended salt and clogging of the membrane over time.

Operating expenses of reverse osmosis water desalinization plants are primarily determined by the energy costs required to drive the high-pressure pump or centrifuge. A hydraulic energy recovery system may be integrated into the reverse osmosis system to combat rising energy costs associated with already energy intensive processes. This involves recovering part of the input energy. For example, turbines are particularly capable of recovering energy in systems that require high operating pressures and large volumes of salt water. The turbine recovers energy during a hydraulic pressure drop. Thus, energy is recovered in a reverse osmosis system based on pressure differentials between opposite sides of the membrane. The pressure on the salt water side is much higher than the pressure on the desalinated water side. The pressure drop produces considerable hydraulic energy recoverable by the turbine. Thus, the energy produced between high pressure and low pressure sections of the reverse osmosis membrane is harnessed and not completely wasted. Recovered energy may be used to drive any of the system components, including the high-pressure pump or centrifuge. Turbines help reduce overall energy expenditures to perform desalinization.

In general, reverse osmosis systems typically consume less energy than thermal distillation and is, therefore, more cost effective. While reverse osmosis works well with somewhat brackish water solutions, reverse osmosis may become overloaded and inefficient when used with heavily salted solutions, such as ocean salt water. Other, less efficient desalinization methods may include ionic exchange, freezing, geothermal desalinization, solar humidification (HDH or MEH), methane hydrate crystallization, high-grade water recycling or RF induced hyperthermia. Regardless of the process, desalinization remains energy intensive. Future costs and economic feasibility continue to depend on both the price of desalinization technology and the costs of the energy needed to operate the system.

In another alternative method of desalinization, U.S. Pat. No. 4,891,140 to Burke, Jr. discloses a method of separating and removing dissolved minerals and organic material from water by destructive distillation. Here, water is heated to a vapor under controlled pressure. Dissolved salt particles and other contaminants fall out of the solution as water evaporates. An integrated hydrocyclone centrifuge speeds up the separation process. The heated, high pressure clean water transfers energy back to the system through heat exchange and a hydraulic motor. Net energy use is therefore relatively lower than the aforementioned processes. In fact, net energy use is essentially equivalent to pump loss and heat loss from equipment operation. One particular advantage of this design is that there are no membranes to replace. This process removes chemicals and other matter that would otherwise damage or destroy membrane-based desalinization devices.

Another patent, U.S. Pat. No. 4,287,026 to Wallace, discloses a method and apparatus for removing salt and other minerals in the form of dissolved solids from salt and other brackish waters to produce potable water. Water is forced through several desalinization stages at high temperature and at high centrifugal velocities. Preferably, the interior components spin the water at speeds up to Mach 2 to efficiently separate and suspend dissolved salt and other dissolved solids from the vaporized water. The suspended salt and other minerals are centrifugally forced outward to be discharged separately from the water vapor. The separated and purified vapor or steam is then condensed back to potable water. The system requires significantly less operational energy than reverse osmosis and similar filtration systems to efficiently and economically purify water. One drawback of this design is that the rotating shaft is built into a vertical chamber. As a result, the rotating shaft sections are only solidly anchored to the base unit by a bearing and a bearing cap. At high rotational speeds (e.g. over Mach 1), vibrations cause excessive bearing shaft and seal failure. Another drawback is that a series of chambers are bolted together in housing sections. The perforated plates are coupled to these sections by an O-ring seal. The housing and O-ring seals tend to wear over time due to salt penetration because the multiple chambers and housing sections are connected via a plurality of nuts and bolts. In particular, the assembly of the Wallace design is particularly laborious. Maintenance is equally labor intensive as it takes significant time to disassemble each of the housing sections, including the O-rings, nuts and bolts. Of course, the device must be reassembled after the requisite maintenance is performed. Each housing section must be carefully put back together to ensure proper sealing therebetween. The system is also prone to a variety of torque and maintenance problems as the device ages, such as O-ring leakage. Moreover, the rotating shaft is connected to the power source by a gear drive, which contributes to the aforementioned reliability problems associated with the bearings, shafts and seals. The system also fails to disclose a means for regulating the speed of the rotating shaft sections according to the osmotic pressure of the salt water being desalinated. The static operation of the Wallace desalinization machine is therefore not as efficient as other modern desalinization devices.

Thus, there is a need in the art for an improved system that includes sensors for monitoring real-time system information and controls for adjusting the mechanical operation of the system to maximize decontamination of the water, such as desalinization of the water, and minimize energy consumption. Such a system should further incorporate multiple recycling cycles to increase the recovery of potable water from approximately eighty percent to between approximately ninety-six percent to ninety-nine percent, should incorporate a polymer aided recovery system to extract trace elements of residue compounds and should consume less energy than other desalinization systems known in the art. The present invention fulfills these needs and provides further related advantages.

SUMMARY OF THE INVENTION

The present invention is directed to a system for processing fluids, such as decontaminating or desalinating water, and generating water vapor, including steam. The system includes an elongated vessel defining an inner chamber. The vessel is oriented generally horizontally. An inlet is formed in the vessel for introducing fluid therein. A plurality of trays is disposed within the inner chamber in spaced relation to one another. The trays include scoops through which fluid—both liquid and vapor—passes. The scoops preferably include an inlet of a first diameter and an outlet of a second smaller diameter. A plurality of baffles, typically apertured plates, is disposed between the trays. Each baffle has a plurality of apertures through which fluid—both liquid and vapor— passes. Preferably, the apertures have an inlet of a first diameter and an outlet of a second smaller diameter. In one embodiment, at least one of the trays includes a flow director extending from a front face thereof and configured to direct flow of the fluid towards a periphery of the tray.

A rotatable shaft passes through the baffles, and is attached to the tray so as to rotate the trays within the inner chamber, while the baffles remain stationary. A drive rotates the shaft. Typically, a gap or a layer or sleeve of low friction material, or bearings, is disposed between the baffles and the shaft.

A contaminant outlet is formed in the vessel and typically in fluid communication with a contaminant water tank. An internal sleeve is disposed in the inner chamber downstream of the trays and baffles. The internal sleeve is proximate to the contaminate outlet and forms an annular passageway leading from the inner chamber to the contaminate outlet. A water vapor outlet is also formed in the vessel and is in communication with a vapor recovery tank for condensing the vapor to liquid water. In one embodiment, at least one treated contaminated water tank is fluidly coupled to the vessel for reprocessing the contaminated water by passing the treated contaminated water through the system again.

In one embodiment, a controller is used to adjust the speed of rotation of the shaft or the water input into the vessel. At least one sensor is in communication with the controller. At least one sensor is configured to determine at least one of: 1) speed of rotation of the shaft or trays, 2) pressure of the inner chamber, 3) temperature of the fluid, 4) fluid input rate, or 5) level of contaminates in the fluid to be processed.

In one embodiment, a turbine is connected to the vapor outlet of the vessel and operably connected to an electric generator. The fluid is heated to at least a boiling temperature thereof so as to create steam, and the vapor and/or steam is passed through the turbine operably connected to the electric generator. A treated fluid return may be disposed between the turbine and the vessel fluid inlet. Alternatively, the shaft may extend out of the vessel and be directly or indirectly coupled to an electric generator.

In a particularly preferred embodiment, the system is attached to a portable framework, which may be transported via semi-trailer truck, ISO container, or the like.

In use, the method for decontaminating fluid and generating the vapor comprises the steps of introducing a fluid having contaminants into the vessel. The fluid is moved through the series of rotating trays alternately separated by the stationary baffles so as to swirl and heat the fluid to effect the vaporization thereof to produce a vapor having at least some of the contaminants separated therefrom. Typically, the fluid is heated to at least one hundred degrees Fahrenheit, but less than two hundred twelve degrees Fahrenheit, if the system does not include a turbine and electric generator. Preferably, the temperature of the vapor is raised to a pasteurization temperature. This is done by rotating the trays to a speed where vapor temperature reaches the pasteurization temperature.

The vapor is removed from the vessel for condensing apart from the separated contaminants and remaining fluid. The vapor is passed through a recovery tank having spaced apart members in a flow path of the vapor for coalescing or condensing to liquid.

In one embodiment, certain conditions are sensed, including at least one of: 1) fluid input into the vessel, 2) the speed of rotation of the trays, 3) pressure within the vessel, 4) temperature of the fluid, or 5) level of separated contaminants. The speed of rotation of the trays or water input into the vessel may be adjusted in response to the sensed conditions. The level of separated contaminants and fluid in a holding tank or concentration of contaminants in the treated fluid may also be sensed, and the separated contaminants and fluid be reprocessed by recirculating them through the vessel.

A system for processing fluids comprises an elongated vessel having a fluid inlet and a shaft through the vessel. The system includes means for centrifugally and axially compressing a fluid, both liquid and vapor but primarily vapor, through the vessel. The system also includes means for rotating the shaft to drive the means for centrifugally and axially compressing. The vessel also includes a fluid outlet, which preferably comprises separate liquid and vapor outlets.

The means for centrifugally and axially compressing comprises a proximate set of alternately spaced trays and baffles. The trays are attached to the shaft and have a plurality of scoops through which the fluid, both liquid and vapor, passes. The baffles are attached to the vessel and have a plurality of apertures through which the fluid, both liquid and vapor, passes.

The means for rotating the shaft comprises a distal set of alternately spaced trays and baffles that functions as an unlighted gas turbine or an hydraulic/water turbine. As with the means for centrifugally and axially compressing, the trays are attached to the shaft and have a plurality of scoops through which the fluid passes. The baffles are attached to the vessel and have a plurality of apertures through which the fluid passes. In one particular embodiment, the scoops on the trays in the means for centrifugally and axially compressing are oriented at a different angle from the scoops on the trays and the means for rotating the shaft.

The system further comprises a means for axially pumping the fluid through the vessel. The means for axially pumping comprises an intake chamber disposed between the fluid inlet and the means for centrifugally and axially compressing. The intake chamber functions as an axial pump once the system is run to an operating rotation speed.

The means for centrifugally and axially compressing vaporizes at least part of the fluid through cavitation such that the fluid comprises non-vaporized dissolved solids, a liquid and a vapor. The means for centrifugally and axially compressing causes centrifugal compression of the fluid, resulting in the non-vaporized dissolved solids and at least part of the liquid moving toward an outer wall of the vessel. The means for centrifugally and axially compressing causes axial flow compression of the liquid and vapor increasing the pressure of the fluid.

The system further comprises a means for discharging the fluid into separate liquid and vapor outlets. This means for discharging comprises a discharge chamber having an internal sleeve defining an annular passageway in communication with the liquid outlet. The separation of the fluid to the separate liquid and vapor outlets results in a reduction in pressure and a physical separation of non-vaporized dissolved solids and the liquid from the vapor.

A method for processing fluids comprising the steps of pumping a fluid through a fluid inlet on an elongated vessel having a shaft therethrough. The method also comprises the step of centrifugally and axially compressing a fluid through the vessel, and rotating the shaft to drive the centrifugal and axial compression. The method also includes the step of discharging the fluid through a fluid outlet on the vessel.

The step of centrifugally and axially compressing comprises the step of passing the fluid through a proximate set of alternately spaced trays attached to the shaft and baffles fixed to the vessels.

The step of rotating the shaft comprises the step of passing the fluid through a distal set of alternately spaced trays attached to the shaft and baffles fixed to the vessel. The distal set of trays and baffles functions as an unlighted gas turbine or a hydraulic/water turbine. The passing steps comprise passing the fluid through a plurality of scoops on the trays and a plurality of apertures on the baffles.

The pumping step comprises the step of axially pumping the fluid through the vessel. The axially pumping step comprises the step of passing the fluid through an intake chamber before performing the centrifugally and axially compressing step. The intake chamber functions as an axial pump to perform the axially pumping step once the system is run to an operating rotation speed.

The step of centrifugally and axially compressing comprises the step of vaporizing at least part of the fluid through cavitation such that the fluid comprises non-vaporized dissolved solids, a liquid and a vapor. The step of centrifugally and axially compressing further comprises the step of moving the non-vaporized dissolved solids and at least part of the liquid toward an outer wall of the vessel. The step of centrifugally and axially compressing also comprises the step of increasing the pressure of the fluid through axial compression of the liquid and vapor. The discharging step comprises the steps of physically separating the non-vaporized dissolved solids and the liquid from the vapor, discharging the non-vaporized dissolved solids and the liquids through a liquid outlet, and discharging the vapor through a vapor outlet. The method further comprises the step of reducing the pressure of the fluid in a discharge chamber.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 4 is an end view of the horizontal water processing vessel attached to a portable framework, in accordance with the present invention;

FIG. 5 is a top view of a rotating tray having a plurality of scoops therein;

FIG. 6 is a cross-sectional view of a portion of the tray and a scoop thereof;

DETAILED DESCRIPTION OF THE PREFERRED EMBODIMENTS

Figure 1:
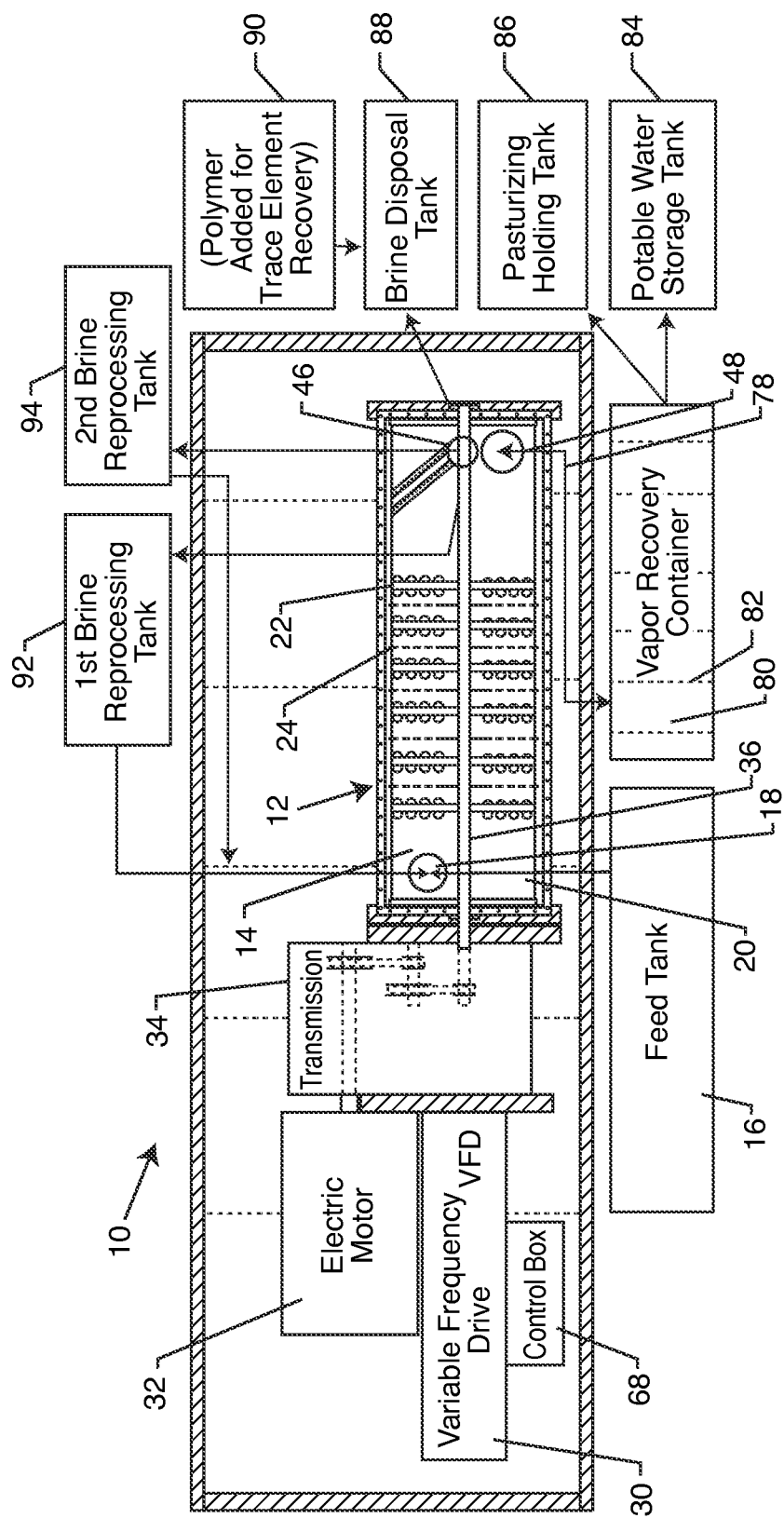
FIG. 1 is a top schematic, and partially sectioned, view of a system for decontaminating water and generating water vapor, in accordance with the present invention.

As shown in the drawings, for purposes of illustration, the present invention resides in a system and method for decontaminating water and generating water vapor. The method and system of the present invention is particularly suitable for desalinization of salt water, such as ocean or other brackish waters, as well as, river water or other liquids/slurries. This preferred treatment will be used for exemplary purposes herein, although it will be understood by those skilled in the art that the system and method of the present invention could be used to decontaminate other water sources. The present invention may be used to remove dissolved or suspended solids (decontamination), as well as, heavy metals and other pollutants. Moreover, as will be more fully described herein, the system and method of the present invention can be used in association with relatively clean water to create water vapor, in the form of steam, which has a sufficient pressure and temperature so as to be passed through a turbine which is operably connected to an electric generator for the generation of electricity, or other steam heating applications.

In the following description, multiple embodiments of the inventive method and system for decontaminating water and generating water vapor are described. Throughout these embodiments and with reference to the drawing figures, functionally equivalent components will be referred to using identical reference numerals.

Figure 2:
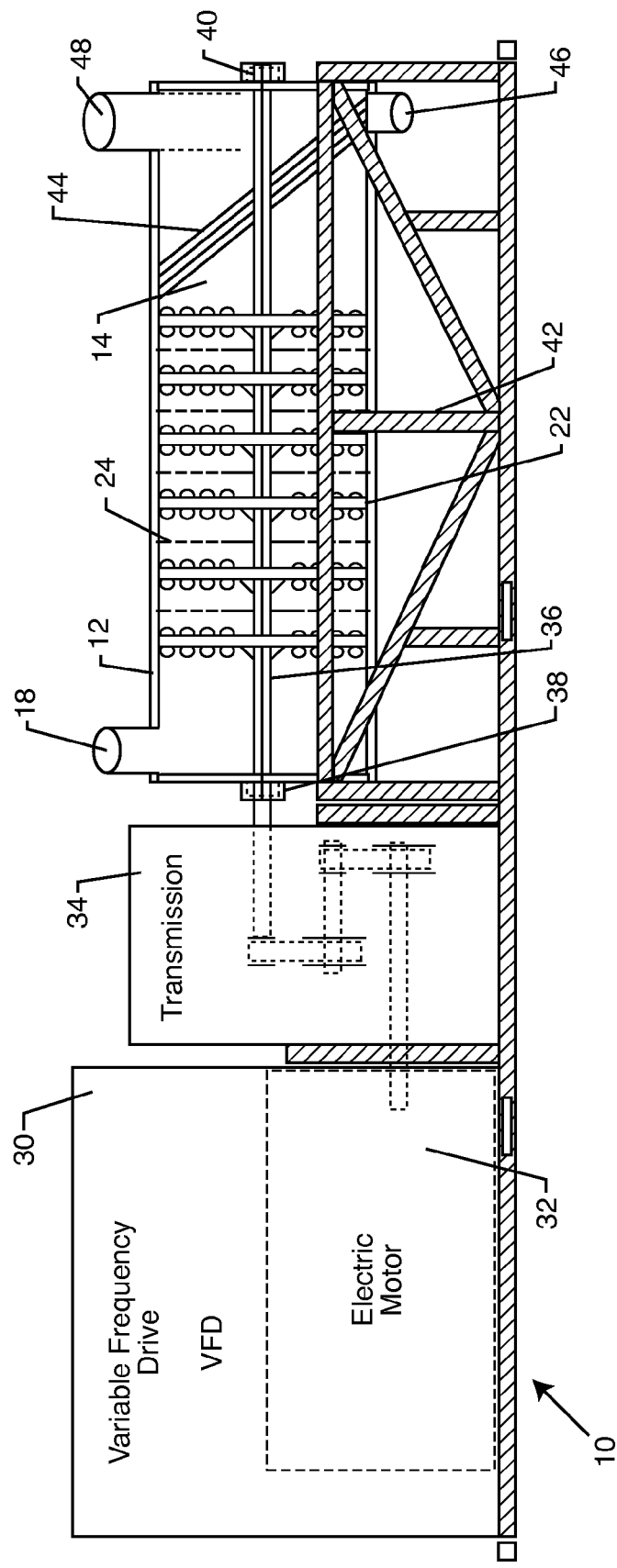
FIG. 2 is a side schematic, and partially sectioned, view of the system of FIG. 1.

With reference now to FIGS. 1 and 2, the system, generally referred to by the reference number 10, includes a water processing vessel or chamber 12 defining an inner chamber 14, wherein salt and other dissolved solids and contaminants are removed from the water to produce essentially mineral-free, potable water. In one embodiment, the processing vessel 12 receives contaminated water from a feed tank 16 through an inlet valve 18 via a feed tank tube 20. In this illustration, the inlet valve 18 enters the vessel 12 laterally through a side wall. This inlet valve 18 can be alternately positioned as described below. The source of water can be sea or ocean water, other brackish waters, or even water which is contaminated with other contaminants. Moreover, the present invention envisions supplying the contaminated water directly from the source, wherein the feed tank 16 may not necessarily be used.

Figure 3:
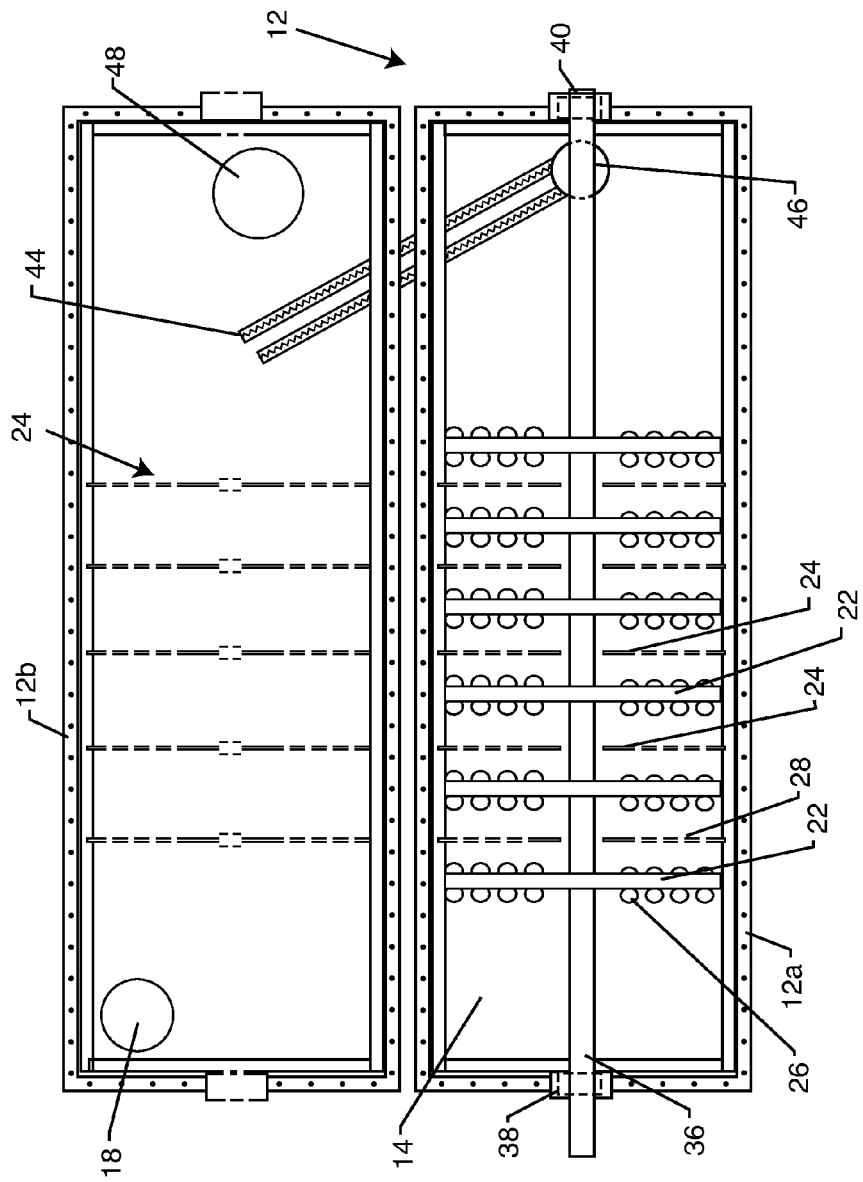
FIG. 3 is a top view illustrating the water processing vessel having an upper portion thereof opened.

With reference now to FIG. 3, in one embodiment, the vessel 12 is comprised of a lower shell and an upper shell portion 12b such that the lower and upper shell portions 12a and 12b can be opened or removed relative to one another so as to access the contents within the inner chamber 14 of the vessel 12. The vessel 12 may also be constructed as a single unit as opposed to lower and upper shell portions. The water processing vessel 12 includes, within the inner chamber 14 a plurality of rotatable trays 22 spaced apart from one another and having a baffle 24 disposed between each pair of trays 22. As will be more fully explained herein, the rotatable trays 22 include a plurality of scoops 26 formed therethrough and the baffles 24 typically comprise plates having a plurality of apertures 28 formed therethrough. The baffles 24 are fixed to the vessel 12 so as to be stationary. The baffles 24 may comprise a lower portion disposed in the lower shell 12a of the vessel and an upper portion attached to and disposed in the upper shell 12b of the vessel 12 and designed to form a single baffle when the lower and upper shells 12a and 12b of the vessel 12 are in engagement with one another and closed. Alternatively, each baffle 24 may comprise a single piece that is attached to either the lower shell 12a or the upper shell 12b in the earlier embodiment or at multiple points in the single unit embodiment. In either embodiment, the baffle 24 will remain generally stationary as the water and water vapor is passed therethrough.

A variable frequency drive 30 regulates the speed at which electric motor 32 drives a transmission 34 and a corresponding shaft 36. The shaft 36 is rotatably coupled to bearings or the like, typically non-friction bearings lubricated with synthetic oil, Schmitt couplers, or ceramic bearings 38 and 40 at generally opposite ends of the vessel 12. The shaft 36 extends through the trays 22 and baffles 24 such that only the trays 22 are rotated by the shaft. That is, the trays 22 are coupled to the shaft 36. Bearings, or a low-friction material, such as a layer or sleeve of Teflon is disposed between the rotating shaft 36 and the aperture plate baffle 24 to reduce friction therebetween, yet stabilize and support the spinning shaft 36. Teflon is not preferred as it could fray and contaminate the fluid.

As can be seen from the drawings, the water processing vessel 12 and inner chamber 14 are oriented generally horizontally. The trays 22 and baffles 24 are oriented vertically within the inner chamber 14 and disposed along the horizontal orientation of the same. The rotating shaft 36 is also disposed along the horizontal orientation of the inner chamber 14. This is in contrast to the Wallace '026 device wherein the water processing chamber was oriented generally vertically, and the top of the rotating shaft was secured by a bearing and a bearing cap, which supported the chamber itself. As a result, the rotating shaft sections were only solidly anchored to the base of the unit. At high rotational operating speeds, vibrations within the system cause excessive bearing, shaft and seal failure. In contrast, horizontally mounting the water processing vessel 12 and inner chamber 14 to a frame structure 42 distributes the rotational load along the length of the vessel 12 and reduces vibrations, such as harmonic vibrations, that could otherwise cause excessive bearing, shaft and seal failures. Moreover, mounting the vessel 12 to the frame structure 42 enhances the portability of the system 10, as will be more fully described herein. Supporting the very rapidly rotating shaft 36 along the horizontal orientation of the vessel 12 and chamber 14 through each baffle 24 further stabilizes the shaft and system and reduces vibrations and damage caused thereby.

As mentioned above, the shaft 36, and trays 22 are rotated at a very high speed, such as Mach 2, although slower speeds such as Mach 1.7 have proven effective. This moves the water through the scoops 26 of the trays 22, which swirls and heats the water such that a water vapor is formed, and the contaminants, salts, and other dissolved solids are left behind and fall out of the water vapor. Most of the intake water is vaporized by 1) vacuum distillation and 2) cavitation created upon impact with the first rotating tray 22, the centrifugal and axial flow compression causes the temperatures and pressures to increase as there is a direct correlation between shaft RPM and temperature/pressure increases or decreases. The water and water vapor is then passed through the apertures 28 of the baffles 24 before being processed again through the next rotating tray 22 with scoops 26. The configurations of the trays 22 and baffles 24 are designed to minimize or eliminate drag and friction in the rotation of the shaft 36 by providing sufficient clearance at the perimeter of the trays 22 and through the central opening 59 of the baffles 24. At the same time leakage around the perimeter of the trays 22 and through the central opening 59 of the baffles 24 is to be minimized so as to increase efficiency.

As the water and water vapor passes through each subchamber of the vessel 12, the temperature of the water vapor is increased such that additional water vapor is created and leaves the salts, dissolved solids, and other contaminants behind in the remaining water. The centrifugal forces on the water and contaminants force it to the wall of the inner chamber 14 and into a set of channels 44 which direct the contaminants and non-vaporized water to an outlet 46. The water vapor which is generated passes through a water vapor outlet 48 formed in the vessel 12. Thus, the water vapor and the contaminants and remaining water are separated from one another. Outlets 46 and 48 are generally opposite the inlet 18 along the horizontal orientation of the inner chamber 14.

As mentioned above, the trays 22 are rotated by the shaft 36. The shaft 36 is supported within the interior of the water processing vessel 12 by a plurality of bearings, as mentioned above. The bearings are typically non-friction bearings lubricated with synthetic oil, steel, or ceramic. Prior art desalinization systems incorporate standard roller bearings which would fail under high rotational speeds and high temperatures. Thus, desalinization systems known in the prior art had high failure rates associated with standard roller bearings. In the present invention, the lubricated non-friction bearings, sealed steel ball bearings, or ceramic bearings 38 and 40 are more durable than standard roller bearings and fail less often under high rotational speeds and temperatures. Moreover, the shaft 36 may be intermittently supported by the low friction materials, such as Teflon sleeves or bearings 50 disposed between the baffle plate 24 and the shaft 36. This further ensures even distribution of weight and forces on the shaft 36 and improves the operation and longevity of the system.

With particular reference now to FIGS. 5 and 6, an exemplary tray 22 is shown, having a plurality of scoops 26 formed therethrough. Although fourteen scoops 26 are illustrated in FIG. 5, it will be appreciated that the number may vary and can be several dozen in a single tray 22, thus the dotted line represents multiple scoops of a variety of numbers.

FIG. 6 is a cross-sectional view of the tray 22 and the scoop 26 formed therein. In a particularly preferred embodiment, the scoops 26 are tapered such that a diameter of an inlet 52 thereof is greater than the diameter of an outlet 54 thereof. The tapered scoop 26 is essentially a Venturi tube that has the vertical opening or inlet 52 substantially perpendicular to the horizontal surface of the rotating tray base 22. Liquid and vapor accelerates through the tapered scoop 26 because the tapered scoop has a larger volume at the entrance 52 thereof and a smaller volume at the exit or outlet 54 thereof. The change in volume from the inlet to the outlet of the tapered scoop 26 causes an increase in velocity due to the Venturi effect. As a result, the liquid water and water vapor is further accelerated and agitated, resulting in increases in temperature and pressure. This further enables separation of the contaminants from within the water vapor. The tapered scoop 26 may be attached to the rotating tray 22 by any means known in the art.

Once again, it will be appreciated that there will be more or less tapered scoops 26 distributed in the entire area of the rotating tray 22, the particular number and size of the scoops 26 will vary depending upon the operating conditions of the system 10 of the present invention. Moreover, the angle of the scoop 26, illustrated as approximately forty-five degrees in FIG. 6, can be varied from tray to tray 22. That is, by increasing the angle of the spinning scoop, such as by twenty-five degrees to thirty-one degrees to thirty-six degrees on the subsequent tray, to forty degrees, forty-five degrees on a next tray, etc. the increase in angle of the scoop 26 of the spinning tray 22 accommodates increases in pressure of the water vapor which builds up as the water vapor passes through the vessel 12. The increase in angle can also be used to further agitate and create water vapor, and increase the pressure of the water vapor, which may be used in a steam turbine, as will be more fully described herein.

Figure 7:
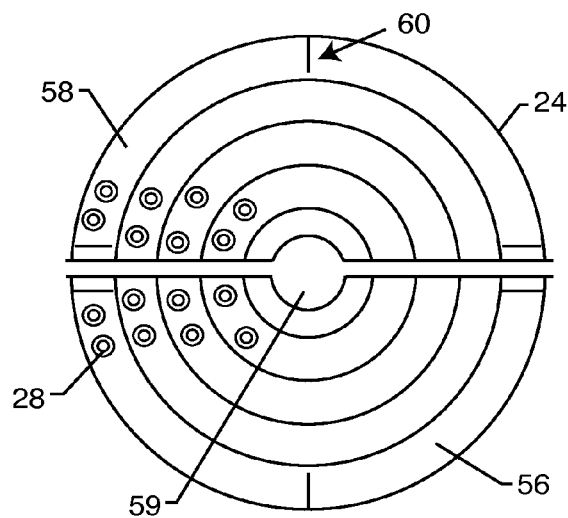
FIG. 7 is a top view of a baffle, used in accordance with the present invention.
Figure 9:
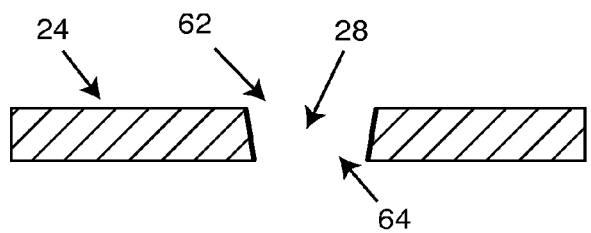
FIG. 9 is a cross-sectional view of a portion of the baffle, illustrating a tapered aperture thereof.

With reference now to FIGS. 7 and 9, a baffle 24, in the form of an apertured plate, is shown in FIG. 7. In this case, the baffle 24 is formed as a first plate member 56 and a second plate member 58 which are connected by connectors 60 to the inner wall of the vessel 12. The connectors 60 can comprise bolts, dowels, rods, or any other connecting means which is adequate. Alternatively, as described above, the baffle 24 can be formed as a single unit connected to either the upper or the lower vessel shell 12a and 12b. When formed as dual plate members 56 and 58, preferably the plate members 56 and 58 inter-engage with one another when the vessel 12 is closed so as to effectively form a single baffle 24.

As described above, a plurality of apertures 28 are formed through the baffle plate 24. FIG. 9 is a cross-sectional view of one such aperture 28. Similar to the tray described above, the aperture preferably includes an inlet 62 having a diameter which is greater than an outlet 64 thereof, such that the aperture 28 is tapered which will increase the pressure and velocity of the water and water vapor which passes therethrough, further increasing the temperature and creating additional vapor from the water. Similar to the tray 22 described above, apertures 28 may be formed in the entire baffle plate, as represented by the series of dashed lines. The particular number and size of the apertures 28 may vary depending upon the operating conditions of the system 10.

Figure 8:
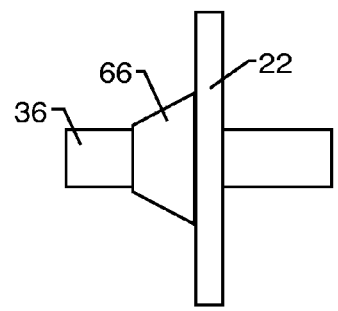
FIG. 8 is a side view of a tray having a water director placed in front thereof.

With reference now to FIG. 8, the shaft 36 is illustrated extending through the rotating tray 22. In one embodiment, a cone-shaped water director 66 is positioned in front of the tray 22. For example, the director 66 may have a forty-five degree angle to deflect the remaining water and vapor passing through the central opening 59 of the baffle 24 from the shaft 36 and towards the periphery or outer edge of the tray 22 for improved vaporization and higher percentage recovery of potable water.

Referring again to FIGS. 3 and 4, as mentioned above, in a particularly preferred embodiment the vessel 12 may be formed into two shells or sections 12a and 12b. This enables rapid inspection and replacement of vessel components, as necessary. Preferably, the wall of the inner chamber 14 and any other components such as the trays 22, baffle plates 24, shaft 36, etc. are treated with Melonite, or other friction reducing and corrosion resistant substance. Of course, these components can be comprised of materials which are corrosion resistant and have a low friction coefficient, such as polished stainless steel or the like. The lower and upper sections 12a and 12b of the vessel 12 are preferably interconnected such that when closed they are substantially air and water tight. Moreover, the closed vessel 12 needs to be able to withstand high temperatures and pressures due to the water vaporization therein during operation of the system 10.

Figure 10:
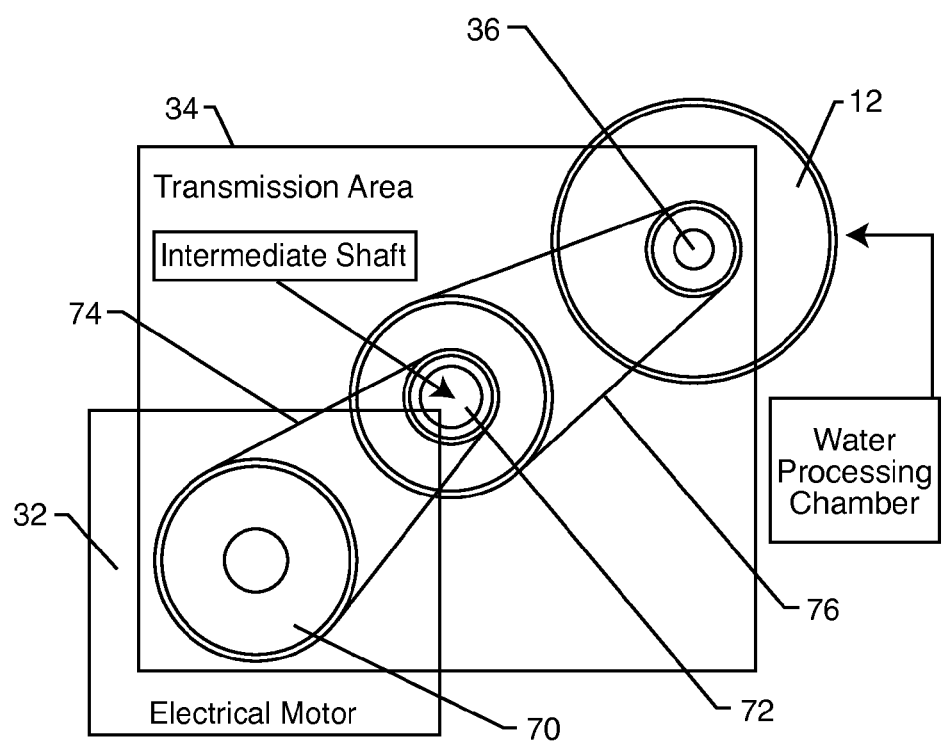
FIG. 10 is a schematic illustrating the electric motor coupled to the transmission and then coupled to the shaft of the water processing vessel, in accordance with the present invention.

With reference now to FIGS. 1, 2 and 10, typically a transmission 34 interconnects the electric motor 32 and the drive shaft 36. The motor 32 may be a combustion engine (gasoline, diesel, natural gas, etc.), electric motor, gas turbine, or other known means for providing drive. The speed of the transmission 34 is set by the variable frequency drive 30. The variable frequency drive 30 is primarily regulated by a computerized controller 68, as will be more fully described herein. The shaft 36 may be belt or gear driven. As described below, the motor 32 may also be directly connected to the shaft 36. With particular reference to FIG. 10, the shaft 70 of the motor is connected to an intermediate shaft 72 by a belt 74. The intermediate shaft 72 is connected to the shaft by another belt 76. The high-speed industrial belt and pulley system shown in FIG. 10 drives the shaft 36 inside the water processing vessel 12. As shown, a plurality of belts 74 and 76 and a set of intermediate shafts 72 increase the rotational output speed at the shaft 36 by a multiple of the rotational input speed applied by the electric motor 32 on the electric motor driveshaft 70. Of course, the ratio of rotational input speed to rotational output speed can be changed by changing the relative rotational velocities of the belts 74 and 76 and corresponding intermediate shafts 72. By coupling the electric motor driveshaft 70 to the shaft 36 via belts 74 and 76 and intermediate shaft 72, and adding a Schmitt coupler on the shaft 36 between the transmission 34 and the chamber 12, the present invention is able to avoid the vibrational and reliability problems that plague other prior art desalinization systems.

With reference again to FIG. 1, as mentioned above, the water vapor is directed through a water vapor outlet 48 of the vessel 12. The water vapor travels through a recovery tube 78 to a vapor recovery container or tank 80. The water vapor then condenses and coalesces into liquid water within the vapor recovery tank 80. To facilitate this, in one embodiment, a plurality of spaced apart members 82, such as in the form of louvers, are positioned in the flow pathway of the water vapor such that the water vapor can coalesce and condense on the louvers and become liquid water. The liquid water is then moved to a potable water storage tank 84 or a pasteurizing and holding tank 86. If the water and water vapor in the vessel 12 is heated to the necessary temperature for pasteurization, so as to kill harmful microorganisms, zebra mussel larvae, and other harmful organisms, the liquid water may be held in holding tank 86.

Figure 15:
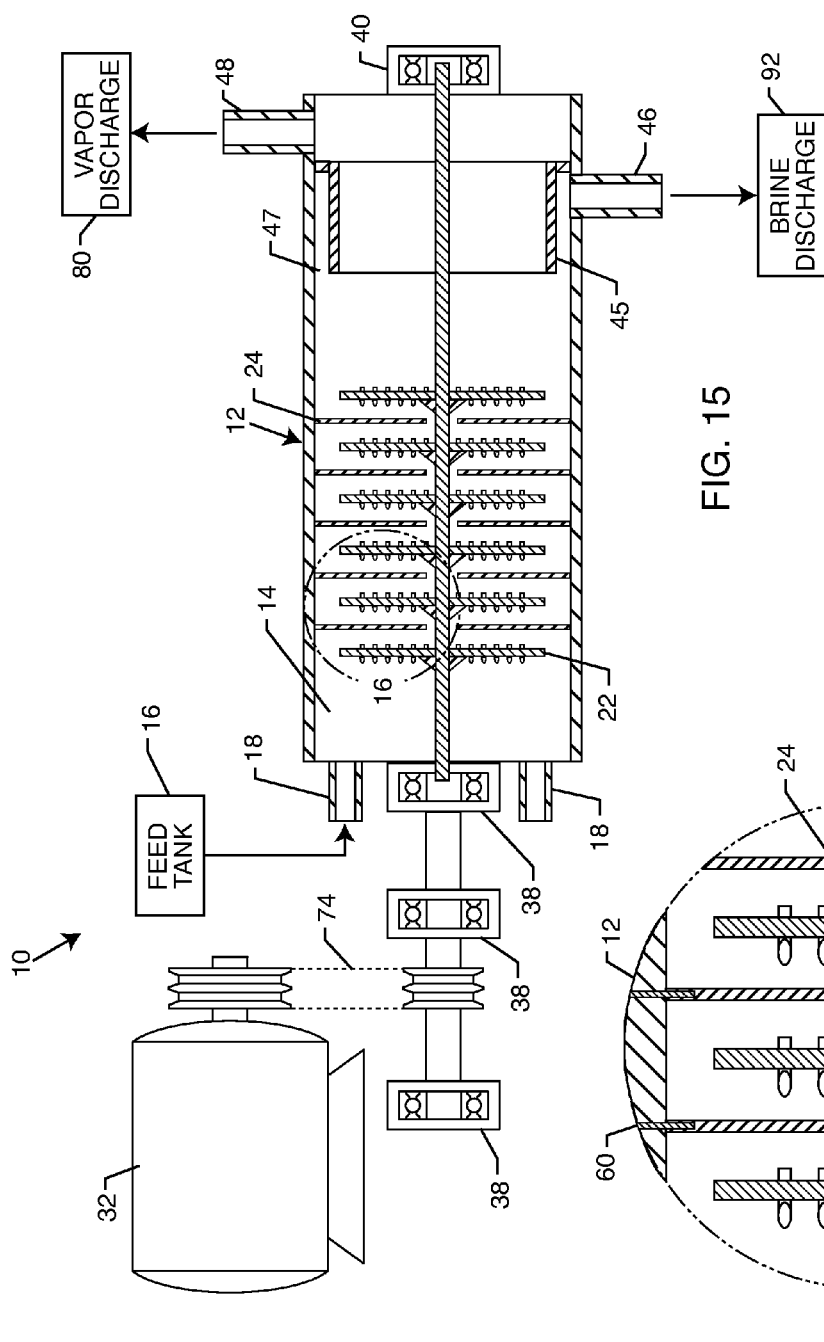
FIG. 15 is a front schematic and partially sectioned view of an alternate embodiment of a system for decontaminating water and generating water vapor, in accordance with the present invention.

With reference now to FIGS. 15-27, another preferred embodiment of the system 10 and water processing vessel 12 is shown. FIG. 15 illustrates the overall system 10 including the alternate single piece construction of the vessel 12. In this embodiment, the vessel 12 has a construction similar to the previously described embodiment, including elements such as the inner chamber 14, the inlet valve 18, the trays 22 having scoops 26, the baffles 24 having apertures 28, the brine outlet 46, and the vapor outlet 48. The inlet valve 18 comprises multiple inlets, preferably at least two, to the vessel 12. These inlets 18 are disposed on the end of the vessel around the shaft 36 so as to more evenly distribute the fluid across the inner chamber 14. A shaft 36 supported by ceramic bearings 38, 40 passes through the center of the trays 22 and baffles 24.

The trays 22 are affixed to the shaft 36 and extend outward toward the wall of the inner chamber 14 as described above. The baffles 24 preferably comprise a single piece extending from the walls of the inner chamber 14 toward the shaft 36 with a central opening 59 forming a gap between the baffles 24 and the shaft 36 as described above. The baffles 24 are preferably fixed to the walls of the inner chamber by screws or dowels 60 also as described above. In a particularly preferred embodiment, the vessel 12 includes six trays 22 and five baffles 24 alternatingly dispersed through the inner chamber 14.

In this alternate embodiment, the inner chamber 14 includes an internal sleeve 45 disposed proximate to the brine outlet 46. The internal sleeve 45 has an annular shape with a diameter slightly less than the diameter of the inner chamber 14. The internal sleeve 45 extends from a point downstream of the last tray 22 to another point immediately downstream of the brine outlet 46. An annular passageway 47 is created between the internal sleeve 45 and the outer wall of the inner chamber 14. In a typical construction, the internal sleeve 45 is about six inches long and the annular passageway 47 is about 1-1½ inches wide. This annular passageway or channel 47 captures the brine or contaminate material that is spun out from the rotating trays 22 to the outer wall of the chamber 14 as described above. This annular passageway 47 facilitates movement of the brine or contaminate material to the outlet 46 and minimizes the chances of contamination of the vapor discharge or buildup of material within the chamber 14.

Figure 16:
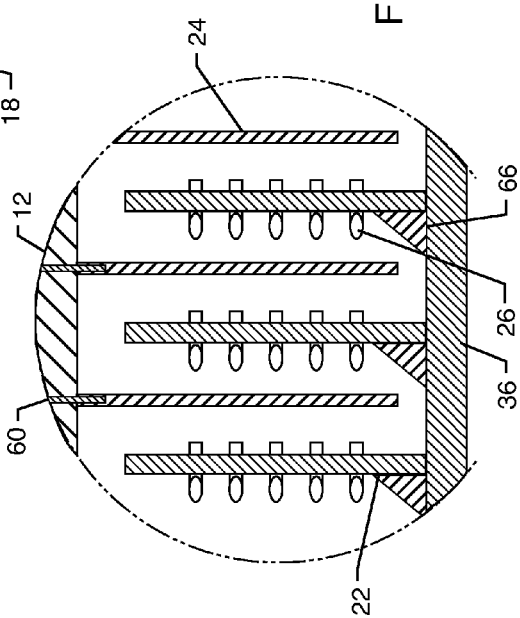
FIG. 16 is a close-up of the trays and baffles of the system of FIG. 15 indicated by circle 16.
Figure 17:
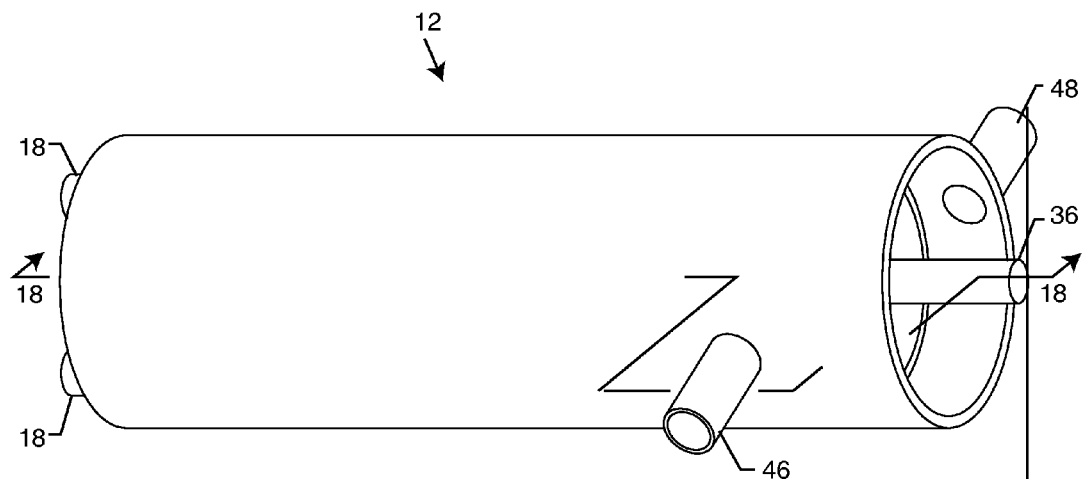
FIG. 17 is a lower perspective view of the vessel with inlet and outlets depicted in the system of FIG. 15.
Figure 18:
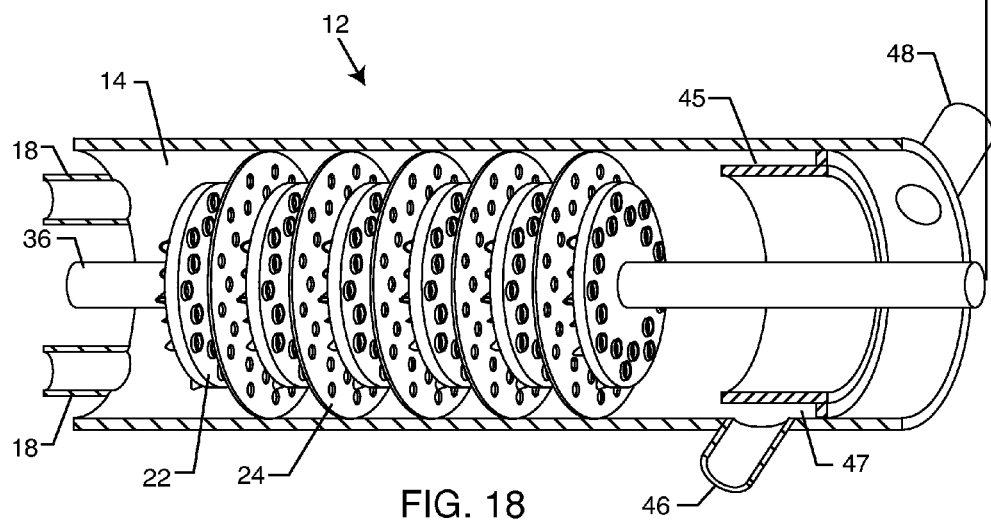
FIG. 18 is a cross-section of the vessel of FIG. 17 taken along line 18-18 thereof.
Figure 19:
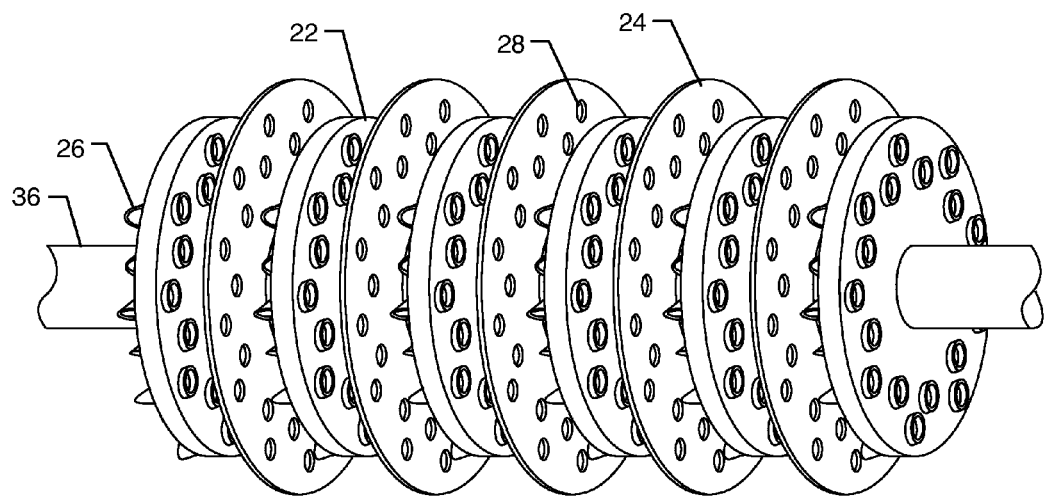
FIG. 19 is an illustration of the shaft with trays and baffles of the system of FIG. 15.

FIG. 16 illustrates a close-up of the trays 22 and baffles 24. One can clearly see how the baffles 24 extend from the wall of the vessel 12 through the chamber 14 and end proximate to the shaft 36. One can also see how the trays 22 are affixed to the shaft 36 and have scoops 26 disposed therethrough as described. A cone 66 is preferably disposed on each tray 22 so as to deflect any fluid flowing along the shaft as described above (FIG. 8). FIG. 17 illustrates an external view of the vessel 12 indicating the inlets 18, the outlets 46, 48 and the shaft 36. Ordinarily, the ends of the vessel 12 would be enclosed and sealed against leaks. They are depicted open here for clarification and ease of illustration. FIG. 18 illustrates a cross-section of the vessel 12 shown in FIG. 17, further illustrating the internal components, including the trays 22, baffles 24, internal sleeve 45 and annular passageway 47. FIG. 19 illustrates the shaft 36 with trays 22 and baffles 24 apart from the vessel 12.

Figure 20:
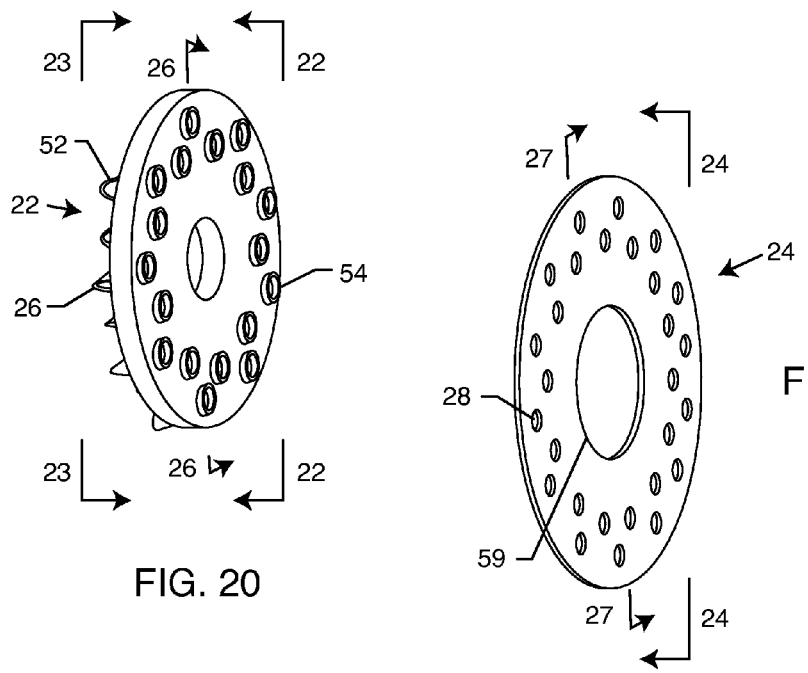
FIG. 20 is an illustration of a tray of the system of FIG. 15.
Figure 21:
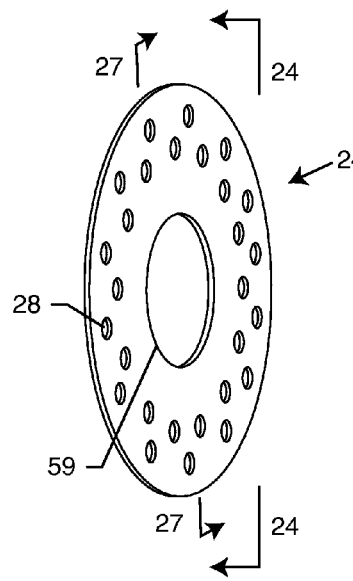
FIG. 21 is an illustration of a baffle of the system of FIG. 15.
Figure 22:
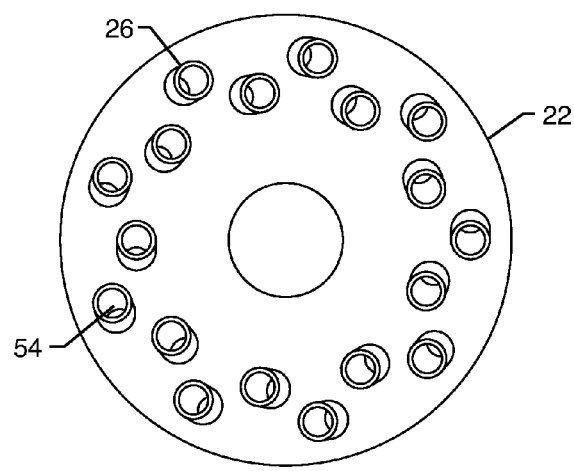
FIG. 22 is a side view of a tray indicated by line 22-22 in FIG. 20.
Figure 23:
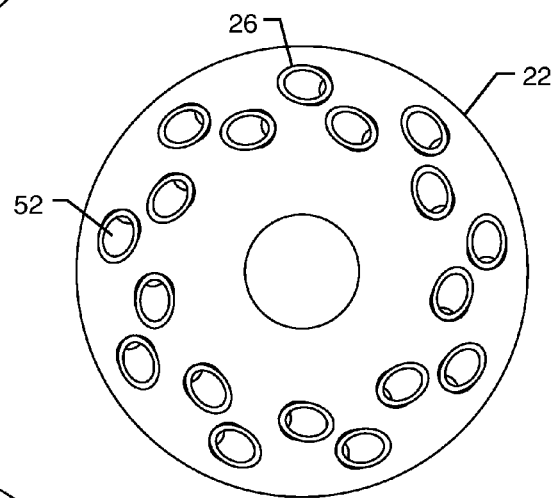
FIG. 23 is an opposite side view of the tray indicated by line 23-23 of FIG. 20.
Figure 24:
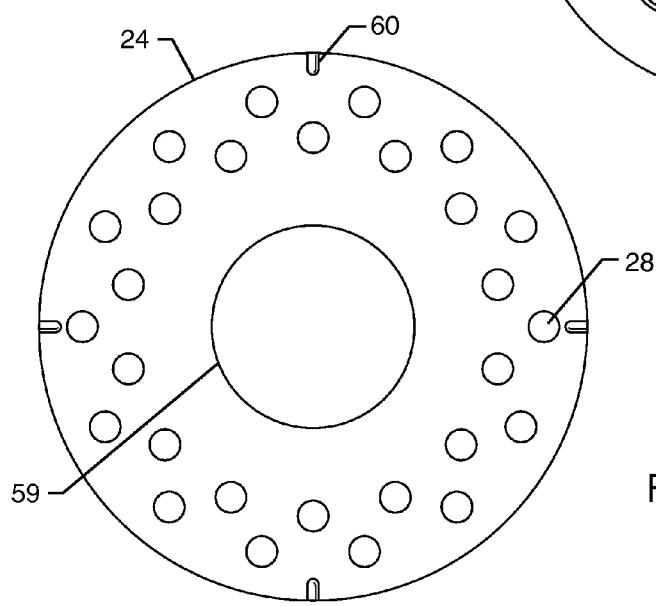
FIG. 24 is a side view of a baffle indicated by line 24-24 in FIG. 21.
Figure 25:
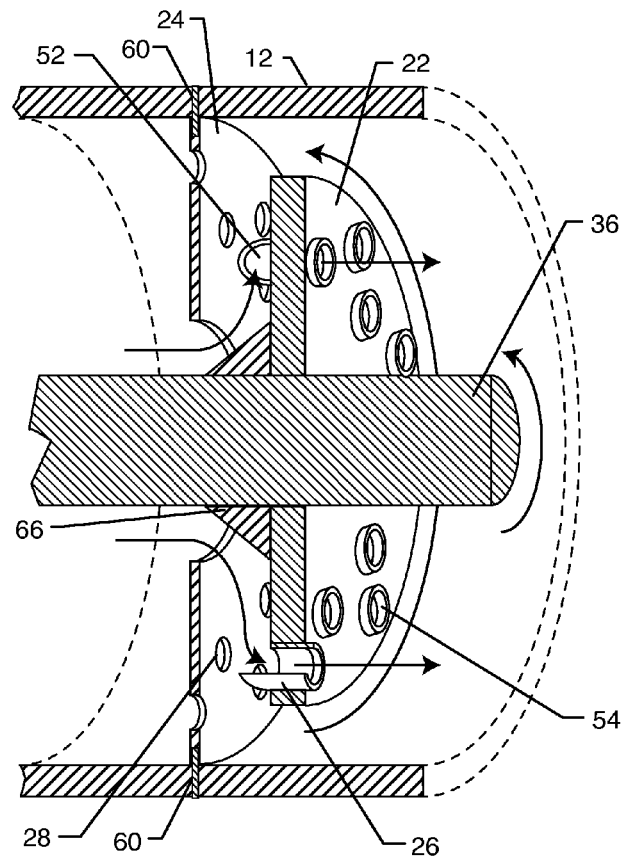
FIG. 25 is a partial cross-sectional view of the shaft, tray and baffle as disposed in the vessel.
Figure 26:
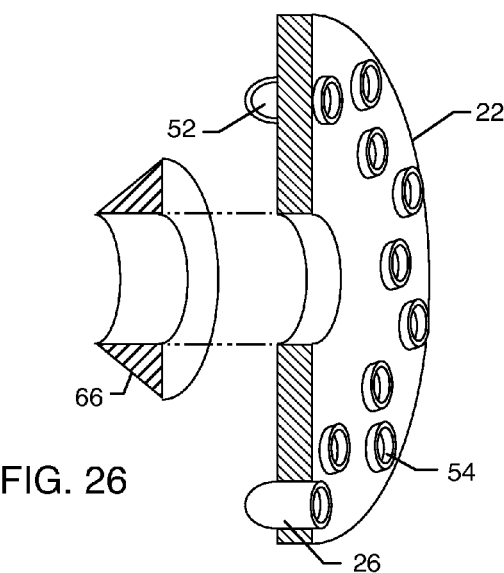
FIG. 26 is a cross-sectional view of a tray taken along line 26-26 of FIG. 20.
Figure 27:
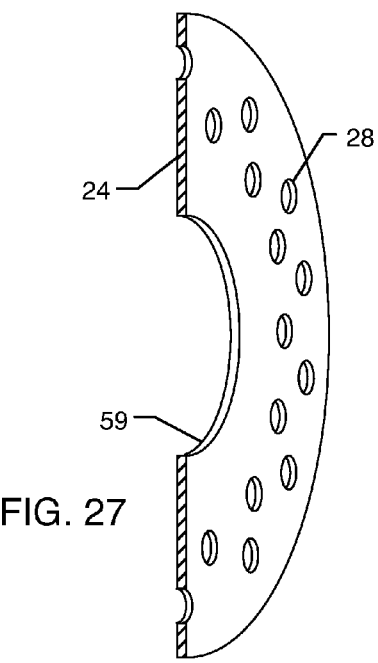
FIG. 27 is a cross-sectional view of a baffle taken along line 27-27 of FIG. 21.

FIGS. 20 and 21 illustrate the tray 22 and baffle 24, respectively. FIGS. 22, 23 and 26 illustrate various views and cross-sections of the tray 22 in FIG. 20. FIGS. 24 and 27 similarly illustrate various views and cross-sections of the baffle 24 in FIG. 21. As discussed, the tray 22 includes scoops 26 which pass through the body of the tray 22. The scoops 26 include a scoop inlet 52 and a scoop outlet 54 configured as described above. The scoop inlet 52 is preferably oriented such that the opening faces into the direction of rotation about the shaft. This maximizes the amount of fluid that enters the scoop inlet 52 and passes through the plurality of scoops. The angle of the scoops 26 on successive trays 22 may be adjusted as described above. The baffle 24 also includes a plurality of apertures 28 configured and profiled (FIG. 9) as described above. FIG. 25 illustrates the shaft 36 and a pairing of a tray 22 with a baffle 24. The arrows indicate the direction of rotation of the shaft and accordingly the tray 22 in this particular figure. The scoops 26 with the scoop inlet 52 are illustrated as facing in the direction of the rotation, i.e., out of the page, in the top half of the figure. In the bottom half of the figure, the scoop 26 with scoop inlet 52 is also illustrated as being oriented in the direction of rotation, i.e., into the page, as the tray 22 rotates with the shaft 36. The direction of rotation may be either clockwise or counter-clockwise. The direction of rotation can be changed without departing from the spirit and scope of the invention. As described in the previous embodiment, the scoop inlet 52 has a larger diameter than the scoop outlet 54 so as to increase the flow rate and decrease the fluid pressure.

In a particularly preferred embodiment, when the main goal of the system 10 is to remove contaminants from the contaminated water, such as salt water, so as to have potable water, the temperature of the water vapor is heated to between one hundred degrees Fahrenheit and less than two hundred twelve degrees Fahrenheit. Even more preferably, the water vapor is heated to between one hundred forty degrees Fahrenheit and one hundred seventy degrees Fahrenheit for pasteurization purposes. However, the water vapor temperature is kept to a minimum and almost always less than two hundred twelve degrees Fahrenheit such that the water does not boil and become steam, which is more difficult to condense and coalesce from water vapor to liquid water. Increased RPMs result in increased temperatures and pressures. The RPMs can be adjusted to achieve the desired temperatures.

The water is boiled and the water vapor temperature is brought to above two hundred twelve degrees Fahrenheit preferably only in instances where steam generation is desirable for heating, electricity generating, and other purposes as will be more fully described herein. This enables the present invention to both pasteurize the water vapor and condense and coalesce the water vapor into liquid water without complex refrigeration or condensing systems, which often require additional electricity and energy.

In one embodiment, the contaminated water, referred to as brine in desalinization processes, is collected at outlet 46 and moved to a brine disposal tank 88. As shown in FIG. 1, polymers or other chemistry 90 may be added to the brine to recover trace elements, etc. Moreover, the salt from the brine may be processed and used for various purposes, including generating table salt, agricultural brine and/or fertilizer.

In one embodiment of the present invention, the treated contaminated water is reprocessed by recycling the contaminants and remaining water through the system again. This may be done multiple times such that the amount of potable water extracted from the contaminated water increases, up to as much as ninety-nine percent. This may be done by directing the contaminants and waste water from the outlet 46 to a first brine, or contaminant, reprocessing tank 92. The remaining waste water, in the form of brine or other contaminants, is then reintroduced through inlet 18 of the vessel 12 and reprocessed and recirculated through the vessel 12, as described above. Additional potable water will be extracted in the form of water vapor for condensing and collection in the vapor recovery tank 80. The remaining contaminants and wastewater are then directed to a second brine or contaminant reprocessing tank 94. The concentration of contaminants or brine will be much higher in the reprocessing tank 92. Once a sufficient level of wastewater or brine has been accumulated in the reprocessing tank 92, this contaminated water is then passed through the inlet 18 and circulated and processed through the system 10, as described above. Extracted potable water vapor is removed at outlet 48 and turned into liquid water in the vapor recovery tank 80, as described above. The resulting contaminants and wastewater can then be placed into yet another reprocessing tank, or into the brine disposal tank 88. It is anticipated that an initial pass-through of seawater will yield, for example, eighty percent to ninety percent potable water. The first reprocessing will yield an additional amount of potable water, such that the total extracted potable water is between ninety percent and ninety-five percent. Passing the brine and remaining water through the system again can yield up to ninety-nine percent recovery of potable water, by recycling the brine at little to no increase in unit cost. Moreover, this reduces the volume of the brine or contaminants, which can facilitate trace element recovery and/or reduce the disposal costs thereof.

Figure 11:
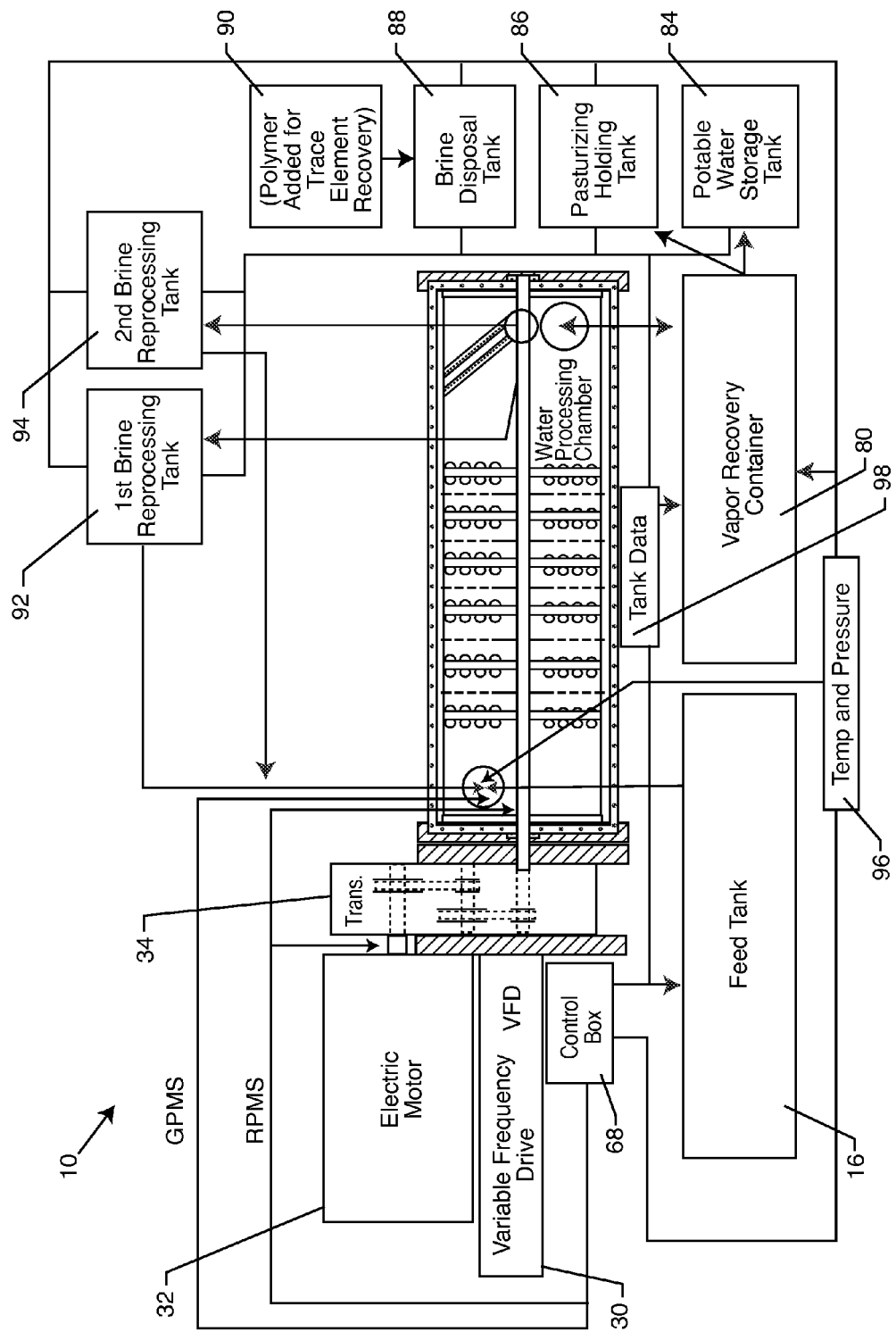
FIG. 11 is a schematic illustration of the system of the present invention, similar to FIG. 1, but illustrating the incorporation of a control box and various sensors, in accordance with the present invention.

With reference now to FIG. 11, in a particularly preferred embodiment, a computer system is integrated into the system 10 of the present invention which regulates the variable frequency drive 30 based on measurements taken from a plurality of sensors that continually read temperature, pressure, flow rate, rotational rates of components and remaining capacity of a variety of tanks connected to the water processing vessel 12. Typically, these readings are taken in real-time.

For example, temperature and/or pressure sensors 96 may be employed to measure the temperature of the water or water vapor within or exiting the vessel 12, as well as the pressure thereof as needed. In response to these sensor readings, the control box 68 will cause the variable frequency drive 30 to maintain the rotational speed of shaft 36, decrease the rotational speed of the shaft 36, or increase the rotational speed of the shaft 36 to either maintain the temperature and pressure, reduce the temperature and pressure, or increase the pressure and temperature, respectively, of the water and water vapor. This may be done, for example, to ensure that the water vapor temperature is at the necessary pasteurization temperature so as to kill all harmful microorganisms and other organisms therein. Alternatively, or in addition to, a sensor may be used to detect the rotational speed (RPMS) of the shaft 36 and/or trays 22 to ensure that the system is operating correctly and that the system is generating the necessary water vapor at a desired temperature and/or pressure. The computerized controller may also adjust the amount of water input through inlet 18 (GPMS) so that the proper amount of water is input as to the amount of water vapor and wastewater which is removed so that the system 10 operates efficiently. The control box 68 may adjust the flow rate of water into the vessel 12, or even adjust the water input.

Figure 28:
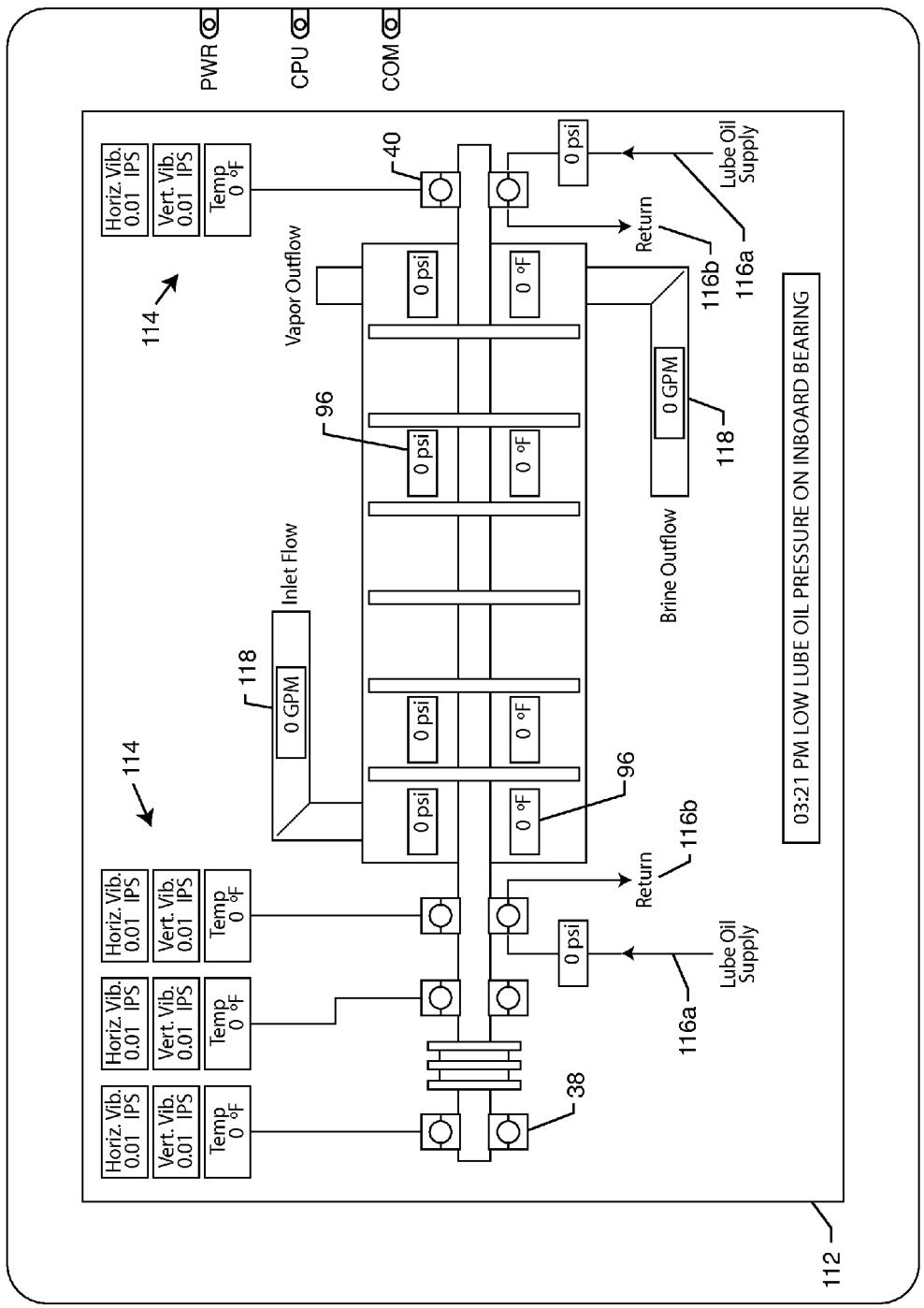
FIG. 28 is a schematic diagram of a control screen for a system of the present invention.

FIG. 28 illustrates schematically a computer display 112 or similar configuration. This computer display schematically illustrates the vessel 12 with the various inlets and outlets 18, 46, 48, as well as the shaft 36 and the plurality of trays 22. The shaft 36 has multiple vibration and temperature sensors 114 disposed along its length. The bearings 38, 40 also include vibration and temperature sensors 114. The vibration and temperature sensors 114 are configured to detect horizontal and vertical vibrations at each point, as well as, the temperature of the shaft 36 generated by the friction of rotation. The bearings 38, 40 include oil supply 116a and return 116b lines to provide lubrication thereof. The inlets 18 and brine outlet 46 include flow meters 118 to detect the corresponding flow rates. Temperature and pressure sensors 96 are disposed throughout the vessel 12. The temperature and pressure sensors 96 are also disposed throughout the vessel 12 to take measurements at various predetermined points.

As indicated above, the contaminated water may come from a feed tank 16, or can be from any other number of tanks, including reprocessing tanks 92 and 94. It is also contemplated that the collected water storage tank could be fluidly coupled to the inlet 18 so as to ensure that the water is purified to a certain level or for other purposes, such as when generating steam which requires a higher purity of water than the contaminated water may provide. As such, one or more sensors 98 may track the data within the tanks to determine water or wastewater/brine levels, concentrations, or flow rates into the tanks or out of the tanks. The controller 68 may be used to switch the input and output of the tanks, such as when the brine is being reprocessed from a first brine reprocessing tank 92 to the second brine reprocessing tank 94, and eventually to the brine disposal tank 88, as described above. Thus, when the first brine reprocessing tank reaches a predetermined level, fluid flow from the feed tank 16 is shut off, and instead fluid is provided from the first brine reprocessing tank 92 into the vessel 12. The treated contaminants and remaining wastewater are then directed into the second brine reprocessing tank 94, until it reaches a predetermined level. Then the water is directed from the second brine reprocessing tank 94 through the system and water processing vessel 12 to, for example, the brine disposal tank 88. Brine water in the first reprocessing tank 92 may be approximately twenty percent of the contaminated water, including most of the total dissolved solids. The residual brine which is finally directed to the brine disposal tank 88 may only comprise one percent of the contaminated water initially introduced into the decontamination system 10 via the feed tank 16. Thus, the temperature and pressure sensors, RPM and flow meters can be used to control the desired water output including water vapor temperature controls that result in pasteurized water.

Figure 12:
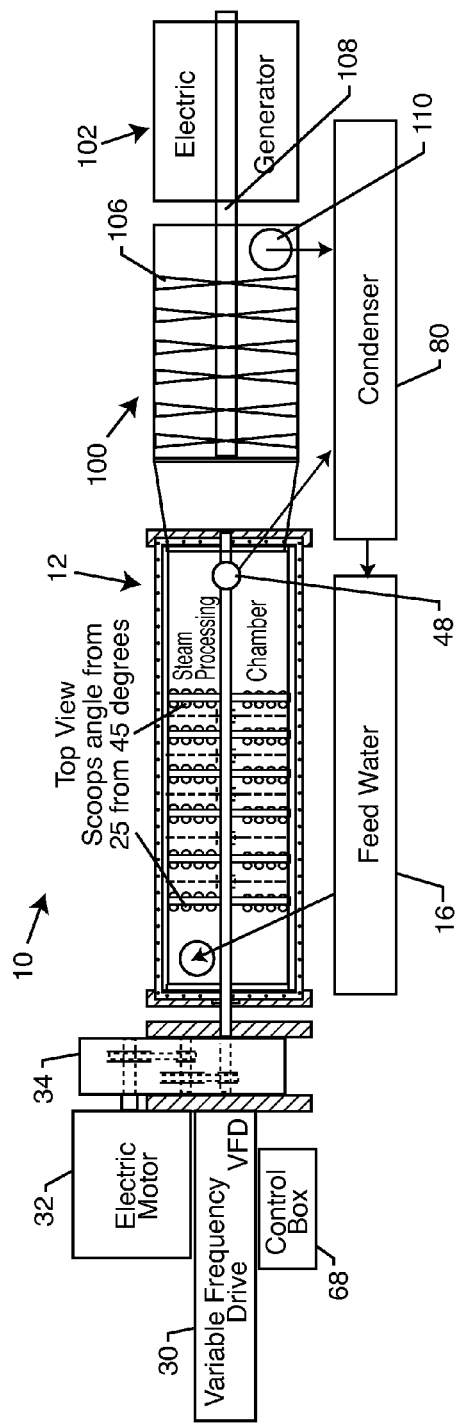
FIG. 12 is a top schematic view of the system of the present invention, incorporating a turbine and electric generator.

The controller 68 can be used to direct the variable frequency drive 30 to power the motor 32 such that the shaft 36 is rotated at a sufficiently high velocity that the rotation of the trays boils the input water and creates steam of a desired temperature and pressure, as illustrated in FIG. 12. FIG. 12 illustrates a steam turbine 100 integrated into the system 10. The steam turbine 100 may also be used with the vessel depicted in FIGS. 15-27. Water vapor in the form of steam could be generated in the water processing vessel 12 to drive a high pressure, low temperature steam turbine by feeding the vapor outlet 48 into an inlet on the turbine 100. The turbine 100 is in turn coupled to an electric generator 102, for cost-effective and economical generation of electricity. Alternately, the shaft 36 of the vessel 12 may be extended to turn the generator 102 directly or indirectly.

Figure 13:
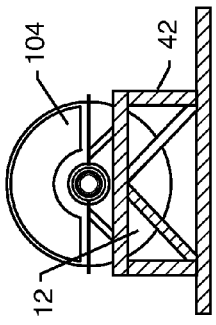
FIG. 13 is an end view of the water processing vessel, illustrating a vapor outlet thereof.
Figure 14:
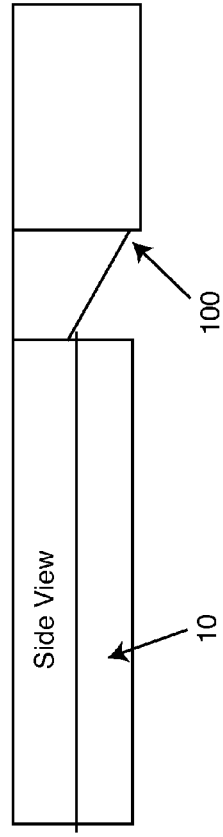
FIG. 14 is a side schematic view of the system of FIG. 12.

In the case of a steam turbine, the water vapor can be heated to in excess of six hundred degrees Fahrenheit and pressurized in excess of sixteen hundred pounds per square inch (psi), which is adequate to drive the steam turbine 100. Aside from the increased velocity of the trays, the incorporation of the tapered nature of the scoops 26 of the trays 22, and the tapered nature of the apertures 28 of the aperture plate baffles 24 also facilitate the generation of water vapor and steam. Increasing the angles of the scoops 26, such as from twenty-five degrees at a first tray to forty-five degrees at a last tray, also increases water vapor generation in the form of steam and increases the pressure thereof so as to be able to drive the steam turbine 100. FIGS. 13 and 14 illustrate an embodiment wherein a steam outlet 104 is formed at an end of the vessel 12 and the steam turbine 100 is directly connected thereto such that the pressurized steam passes through the turbine 100 so as to rotate the blades 106 and shaft 108 thereof so as to generate electricity via the electric generator coupled thereto. A water vapor outlet 110 conveys the water vapor to a vapor recovery container 80 or the like. The recovery tank 80 may need to include additional piping, condensers, refrigeration, etc. so as to cool the steam or high temperature water vapor so as to condense it into liquid water.

Of course, it will be appreciated by those skilled in the art that the steam generated by the system 10 can be used for other purposes, such as heating purposes, removal of oil from oil wells and tar and shale pits and the like, etc.

It will also be appreciated that the present invention, by means of the sensors and controller 68 can generate water vapor of a lower temperature and/or pressure for potable water production, which water vapor is directed through outlet 48 directly into a vapor recovery container, and the system sped up to create high temperature water vapor or steam for passage through the steam turbine 100 to generate electricity as needed. For example, during the nighttime hours, the system 10 may be used to generate potable water when very little electricity is needed. However, during the daylight hours, the system 10 can be adjusted to generate steam and electricity.

As described above, many of the components of the present invention, including the variable frequency drive 30, electric motor 32, transmission 34, and water processing vessel 12 and the components therein can be attached to a framework 42 which is portable. The entire system 10 of the present invention can be designed to fit into a forty foot long ISO container. This container can be insulated with a refrigeration (HVAC) unit for controlled operating environment and shipping and storage. The various tanks, including the feed tank, vapor recovery tank, portable water storage tank, and contaminant/brine reprocessing or disposal tanks can either be fit into the transportable container, or transported separately and connected to the inlet and outlet ports as needed. Thus, the entire system 10 of the present invention can be easily transported in an ISO container, or the like, via ship, semi-tractor trailer, or the like. Thus, the system 10 of the present invention can be taken to where needed to address natural disasters, military operations, etc., even at remote locations. Such an arrangement results in a high level of mobility and rapid deployment and startup of the system 10 of the present invention.

Figure 29:
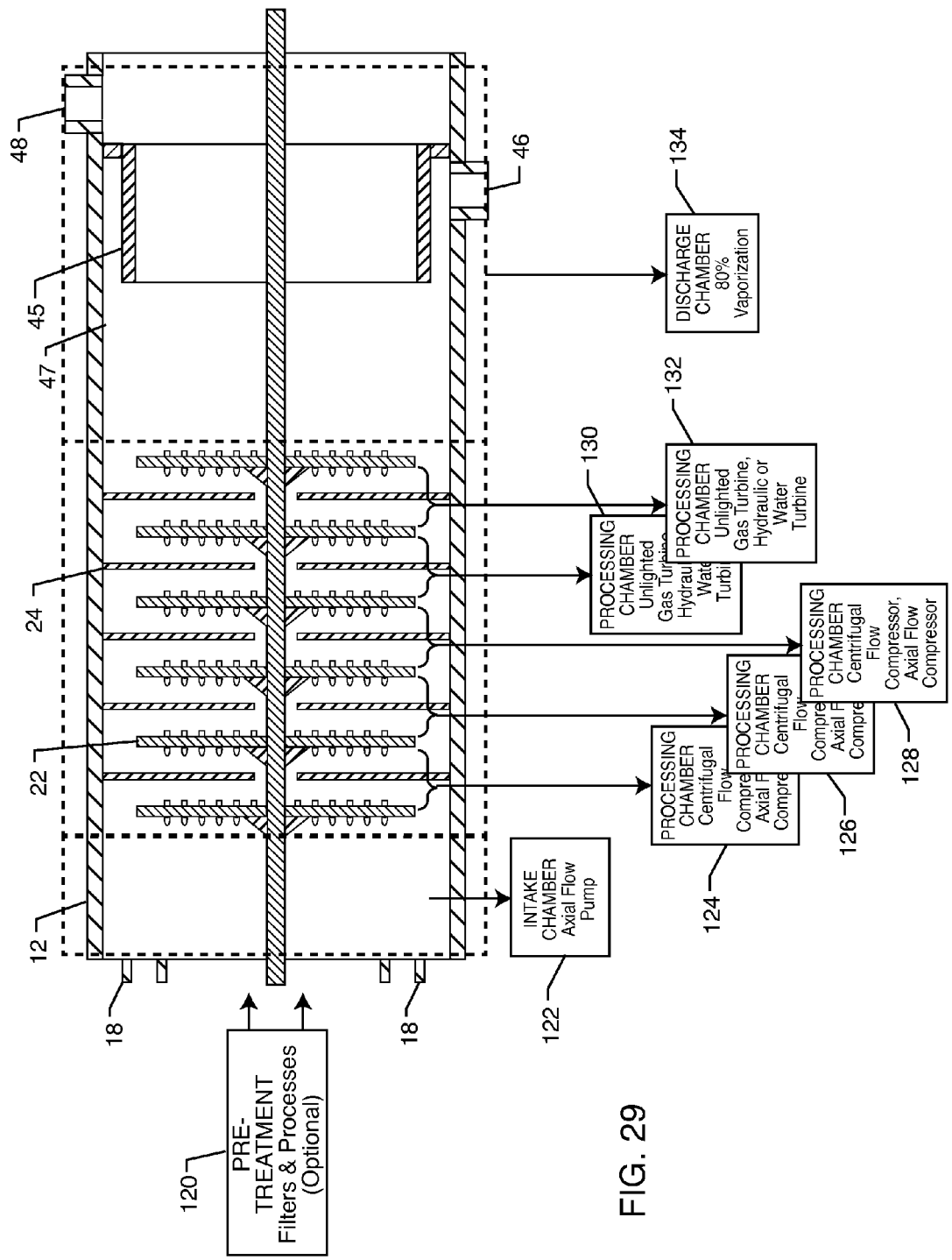
FIG. 29 is a schematic illustration of the processes occurring at various points throughout the water processing vessel of the present invention.

FIG. 29 schematically illustrates the processes occurring at various points, i.e., sub-chambers, throughout the vessel 12.

The inner chamber 14 of the vessel 12 is effectively divided into a series of sub-chambers as illustrated. The vessel 12 contains five sub-chambers that perform the functions of an axial flow pump, an axial flow compressor, a centrifugal flow compressor, an unlighted gas turbine and/or a hydraulic/water turbine. In operation, the system 10 has the capability to vaporize the water through a mechanical process, thereby enabling efficient and effective desalination, decontamination and vaporization of a variety of impaired fluids. Before entering the vessel 12, the fluid may be subject to a pretreatment step 120 wherein the fluid is passed through filters and various other processes to separate contaminants that are more easily removed or that may damage or degrade the integrity of the system 10. Upon passing through the inlets 18, the fluid enters an intake chamber 122 which has an effect on the fluid similar to an axial flow pump once the system 10 reaches its operating rotation speed. An external initiating pump (not shown) may be shut off such that the system 10 draws the contaminated water through the inlet, i.e., the intake chamber functions as an axial flow pump, without the continued operation of the initiating pump. A significant reduction in intake chamber pressure causes vacuum distillation or vaporization to occur at temperatures below 212° F. Following the intake chamber 122, the fluid encounters the first tray 22 where it enters the first processing chamber 124. This first processing chamber acts as both a centrifugal flow compressor and as an axial flow compressor through the combined action of the rotating tray 22 and the adjacent baffle 24. A high percentage of the intake water is vaporized through cavitation upon impact with the high speed rotating tray 22 in the first processing chamber 124. A centrifugal flow compression process occurs within the first processing chamber 124 and each subsequent processing chamber. The centrifugal flow compression process casts the non-vaporized dissolved solids and at least some of the liquid water to the outer wall of the processing chamber 124. This action separates the dissolved solids and most of the remaining liquid from the vapor. An axial flow compression process also occurs within the first processing chamber 124 and each subsequent chamber. This axial flow compression process compresses the vapor and liquid which also increases the pressure and temperature within the processing chamber. The second processing chamber 126 and the third processing chamber 128 both function similarly by compounding the action of the centrifugal flow compressor and axial flow compressor features of the first processing chamber 124.

By the time the fluid reaches the fourth processing chamber 130 it has been subjected to centrifugal flow and axial flow compression processes such that the nature of the fluid and its flow through the vessel 12 has changed. In the fourth processing chamber the fluid behaves as if it is passing through an unlighted gas turbine or an hydraulic/water turbine by causing rotation of the shaft 36. The fifth processing chamber 132 compounds this unlighted gas turbine or hydraulic/water turbine process. The turbine processes of the fourth and fifth processing chambers 130, 132 supply a measure of force to drive rotation of the shaft 36 such that power on the motor 32 may be throttled back without a loss of functionality in the system 10. After exiting the fifth processing chamber 132 the fluid has been separated to a high degree such that nearly all of the contaminants in the form of brine pass through the annular passageway 47 to the outlet 46 and the purified vapor passes through the central portion of the inner chamber 14 to the vapor outlet 48. The turbine operations of the fourth and fifth processing chambers 130, 132 allow for continued operation of the system 10 with a reduced energy input (by as much as 25%) as compared to a startup phase once an equilibrium in the operation is reached.

After the fifth processing chamber 132, the system includes a discharge chamber. The discharge chamber 134, which is larger than any of the preceding processing chambers, contains the two discharge outlets 46, 48. The large increase in volume results in a dramatic reduction in pressure and a physical separation of the dissolved solids and the remaining water from the vapor.

The dimensions of the vessel 12 are preferably configured such that the combined processing chambers, 124-132 occupy about one-half of the total length. The discharge chamber 134 occupies about one-third of the total length. The remainder of the length of the vessel, about one-sixth of the total length, is occupied by the intake chamber 122. The processing chambers 124-132 are divided into approximately three-fifths compressor functionality and two-fifths turbine functionality. Once the fluid exits the last processing chamber 132, it has achieved about eighty percent vaporization as it enters the discharge chamber 134 and is directed to the respective outlets 46, 48.

Although several embodiments have been described in detail for purposes of illustration, various modifications may be made without departing from the scope and spirit of the invention. Accordingly, the invention is not to be limited, except as by the appended claims.

What is claimed is:

1. A system for processing a fluid, comprising:
   an elongated vessel defining an inner chamber, the vessel and inner chamber being oriented generally horizontally;
   a fluid inlet formed in the vessel;
   a plurality of trays oriented vertically and disposed along the horizontal orientation of the inner chamber in spaced relation to one another, each of the plurality of trays including scoops through the trays through which fluids pass, wherein the scoops include an inlet of a first diameter and an outlet of a second smaller diameter;
   a plurality of baffles oriented vertically and disposed along the horizontal orientation of the inner chamber, each of the plurality of baffles alternately spaced with each of the plurality of trays, each of the plurality of baffles having apertures through the baffles through which fluids pass, wherein the apertures have an inlet of a first diameter and an outlet of a second smaller diameter;
   a rotatable shaft disposed along the horizontal orientation of the inner chamber, the shaft passing through the baffles and attached to the trays so as to rotate the trays within the inner chamber;
   a contaminate outlet formed in the vessel opposite the fluid inlet along the horizontal orientation of the inner chamber;
   an internal sleeve disposed in the inner chamber downstream of the trays and baffles, proximate to the contaminate outlet, the internal sleeve forming an annular passageway leading from the inner chamber to the contaminate outlet; and
   a vapor outlet formed in the vessel opposite the fluid inlet along the horizontal orientation of the inner chamber and in communication with a vapor recovery tank for condensing vapor.

2. The system of claim 1, wherein the system is attached to a portable framework.

3. The system of claim 1, further comprising means for rotating the shaft.

4. The system of claim 1, wherein at least one of the trays includes a flow director extending from a front face thereof and configured to direct flow of the fluid towards a periphery of the tray.

5. The system of claim 3, further comprising a controller for adjusting a speed of rotation of the shaft or fluid input to the vessel.

6. The system of claim 5, further comprising at least one sensor in communication with the controller and configured to determine at least one of: 1) speed of rotation of the shaft or trays, 2) pressure of the inner chamber, 3) temperature of the fluid, 4) fluid input rate, or 5) level of contaminates in the fluid to be processed.

7. The system of claim 6, further comprising at least one treated contaminated fluid tank fluidly coupled to the contaminate outlet of the vessel which is in turn connected to the fluid inlet on the vessel for reprocessing the contaminated fluid by passing the treated contaminated fluid through the system.

8. The system of claim 1, including a turbine connected to the vapor outlet of the vessel and operably connected to an electric generator.

9. The system of claim 8, including a treated fluid return between an outlet on the turbine and the fluid inlet on the vessel.

10. The system of claim 1, wherein the shaft extends out of the vessel and is coupled to an electric generator.

11. The system of claim 10, wherein the shaft is directly coupled to the electric generator.

12. A system for processing fluids, comprising:
an elongated vessel having a fluid inlet and a shaft through the vessel, wherein said elongated vessel and shaft are oriented horizontally;
means for centrifugally and axially compressing a fluid through the vessel once the system is run to an operating rotation speed, wherein the means for centrifugally and axially compressing comprises a proximate set of vertically oriented, alternately spaced trays and baffles, the trays disposed along the horizontal orientation of the vessel attached to the shaft and having a plurality of scoops through which the fluid passes, the baffles disposed along the horizontal orientation of the vessel attached to the vessel and having a plurality of apertures through which the fluid passes, wherein each of the plurality of scoops and plurality of apertures have an inlet of a first diameter and an outlet of a second smaller diameter;
means for rotating the shaft to drive the means for centrifugally and axially compressing once the system is run to the operating rotation speed, wherein the means for rotating the shaft comprises a distal set of vertically oriented, alternately spaced trays and baffles, the trays disposed along the horizontal orientation of the vessel attached to the shaft and having a plurality of scoops through which the fluid passes, the baffles disposed along the horizontal orientation of the vessel attached to the vessel and having a plurality of apertures through which the fluid passes, wherein each of the plurality of scoops and plurality of apertures have an inlet of a first diameter and an outlet of a second smaller diameter, and wherein the mean for rotating the shaft is driven by a fluid flow from the means for centrifugally and axially compressing;
a vapor outlet and a contaminate outlet on the vessel, both opposite the fluid inlet along the horizontal orientation of the vessel; and
an internal sleeve disposed in the vessel downstream of the means for rotating the shaft and separating the vapor outlet from the contaminate outlet, the internal sleeve forming an annular passageway leading to the contaminate outlet.

13. The system of claim 12, further comprising a means for axially pumping the fluid through the vessel.

14. The system of claim 13, wherein the means for axially pumping comprises an intake chamber disposed between the fluid inlet and the means for centrifugally and axially compressing.

15. The system of claim 14, wherein the intake chamber functions as an axial pump once the system is run to the operating rotation speed.

16. The system of claim 12, wherein the means for centrifugally and axially compressing vaporizes at least part of the fluid through cavitation such that the fluid comprises non-vaporized dissolved solids, a liquid and a vapor.

17. The system of claim 16, wherein the means for centrifugally and axially compressing causes centrifugal compression of the fluid, resulting in the non-vaporized dissolved solids and at least part of the liquid moving toward an outer wall of the vessel.

18. The system of claim 16, wherein the means for centrifugally and axially compressing causes axial flow compression of the liquid and vapor increasing the pressure of the fluid.

19. The system of claim 16, further comprising a means for discharging the fluid into the contaminate outlet and the vapor outlet, resulting in a reduction in pressure and a physical separation of the non-vaporized dissolved solids and the liquid from the vapor.

20. The system of claim 12, wherein the means for rotating the shaft in the form of the distal set of vertically oriented, alternately spaced trays and baffles functions as an unlighted gas turbine or an hydraulic/water turbine under the fluid flow from the means for centrifugally and axially compressing, once the system is run to the operating rotation speed.

* * * * *